US010161593B2

(12) United States Patent
Bennett et al.

(10) Patent No.: US 10,161,593 B2
(45) Date of Patent: Dec. 25, 2018

(54) SOLID STATE LIGHTING DEVICE WITH VIRTUAL FILAMENT(S)

(71) Applicant: 3M INNOVATIVE PROPERTIES COMPANY, St. Paul, MN (US)

(72) Inventors: Robert Bennett, Berkshire (GB); David Scott Thompson, West Lakeland, MN (US); John A. Wheatley, Lake Elmo, MN (US); Gilles J. Benoit, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 222 days.

(21) Appl. No.: 15/118,972

(22) PCT Filed: Apr. 2, 2014

(86) PCT No.: PCT/US2014/032644
§ 371 (c)(1),
(2) Date: Aug. 15, 2016

(87) PCT Pub. No.: WO2015/130327
PCT Pub. Date: Sep. 3, 2015

(65) Prior Publication Data
US 2017/0059119 A1    Mar. 2, 2017

Related U.S. Application Data

(63) Continuation-in-part of application No. 14/188,687, filed on Feb. 25, 2014, now Pat. No. 9,046,637.

(51) Int. Cl.
*F21V 3/02*     (2006.01)
*F21V 23/00*    (2015.01)
(Continued)

(52) U.S. Cl.
CPC ............... *F21V 3/02* (2013.01); *F21K 9/272* (2016.08); *F21K 9/275* (2016.08); *F21V 5/04* (2013.01);
(Continued)

(58) Field of Classification Search
CPC ............ G02B 6/0096; F21V 7/04; F21V 5/04
See application file for complete search history.

(56) References Cited

U.S. PATENT DOCUMENTS 4,834,495 A    5/1989 Whitehead et al.
4,850,665 A    7/1989 Whitehead
(Continued)

FOREIGN PATENT DOCUMENTS

WO    WO 2008/144636    11/2008
WO    WO 2008/144644    11/2008
(Continued)

OTHER PUBLICATIONS

3M, "Vikuiti™ Transmissive Right Angle Film II (TRAF II)", 2010, 2 pgs.
(Continued)

*Primary Examiner* — William N Harris

(57) ABSTRACT

Lighting systems and devices include a light-transmissive tube and a light source assembly. The light-transmissive tube defines a cavity that extends along a longitudinal axis, at least a portion of the tube having an inner structured surface facing the cavity, and an outer structured surface facing away from the cavity. The light source assembly is disposed to inject light into the cavity, and includes one or more discrete light sources such as LED sources. The inner and outer structured surfaces of the tube are configured to direct a first portion of the injected light out of the tube through the outer structured surface and to direct a second portion of the
(Continued)

injected light back into the cavity, such that a virtual filament, or pattern of virtual filaments, appears in the tube.

23 Claims, 25 Drawing Sheets

(51) Int. Cl.

| | | |
|---|---|---|
| F21K 9/275 | (2016.01) | |
| F21V 5/04 | (2006.01) | |
| F21V 17/10 | (2006.01) | |
| F21V 7/04 | (2006.01) | |
| F21V 15/015 | (2006.01) | |
| F21K 9/272 | (2016.01) | |
| F21V 8/00 | (2006.01) | |
| F21Y 115/10 | (2016.01) | |
| F21Y 103/10 | (2016.01) | |
| F21V 15/01 | (2006.01) | |

(52) U.S. Cl.
CPC ............... *F21V 7/04* (2013.01); *F21V 15/01* (2013.01); *F21V 15/015* (2013.01); *F21V 17/101* (2013.01); *F21V 23/003* (2013.01); *G02B 6/0096* (2013.01); *F21Y 2103/10* (2016.08); *F21Y 2115/10* (2016.08); *G02B 6/0038* (2013.01)

(56) References Cited

U.S. PATENT DOCUMENTS

| | | | |
|---|---|---|---|
| 4,989,948 A | 2/1991 | Dreyer, Jr. | |
| 5,035,486 A | 7/1991 | Inokuchi | |
| 5,183,597 A | 2/1993 | Lu | |
| 5,339,382 A | 8/1994 | Whitehead | |
| 5,471,348 A | 11/1995 | Miller et al. | |
| 5,745,632 A | 4/1998 | Dreyer | |
| 5,882,774 A | 3/1999 | Jonza et al. | |
| 6,337,946 B1 | 1/2002 | McGaffigan | |
| 6,510,381 B2 | 1/2003 | Grounds et al. | |
| 6,531,230 B1 | 3/2003 | Weber et al. | |
| 7,537,374 B2 | 5/2009 | Schardt et al. | |
| 7,547,476 B2 | 6/2009 | Jones et al. | |
| 7,695,180 B2 | 4/2010 | Schardt et al. | |
| 7,815,355 B2 | 10/2010 | Thompson et al. | |
| 8,487,518 B2 | 7/2013 | Johnston et al. | |
| 8,967,837 B2 | 3/2015 | Tsuel et al. | |
| 9,261,641 B2 | 2/2016 | Sykora et al. | |
| 9,470,830 B2 * | 10/2016 | Liang .................... | F21V 29/004 |
| 2005/0024754 A1 | 2/2005 | Epstein et al. | |
| 2007/0047228 A1 | 3/2007 | Thompson et al. | |
| 2007/0242473 A1 | 10/2007 | Lee et al. | |
| 2008/0037127 A1 | 2/2008 | Weber | |
| 2009/0017256 A1 | 1/2009 | Hunt et al. | |
| 2011/0032708 A1 | 2/2011 | Johnston et al. | |
| 2011/0310587 A1 | 12/2011 | Edmond et al. | |
| 2012/0154450 A1 | 6/2012 | Aho et al. | |
| 2012/0162965 A1 * | 6/2012 | Takeuchi ................. | F21V 9/30 362/84 |
| 2012/0194054 A1 | 8/2012 | Johnston et al. | |
| 2012/0206806 A1 | 8/2012 | Weber | |
| 2013/0215512 A1 | 8/2013 | Coggio et al. | |
| 2013/0258709 A1 | 10/2013 | Thompson et al. | |
| 2013/0343046 A1 | 12/2013 | Tsai | |
| 2014/0043846 A1 | 2/2014 | Yang et al. | |
| 2014/0043847 A1 | 2/2014 | Yang et al. | |
| 2014/0043850 A1 | 2/2014 | Thompson et al. | |
| 2014/0211481 A1 * | 7/2014 | Liang .................... | F21V 29/004 362/308 |
| 2014/0268802 A1 * | 9/2014 | Sun .......................... | F21V 5/04 362/294 |
| 2014/0286044 A1 | 9/2014 | Johnson et al. | |
| 2014/0334126 A1 * | 11/2014 | Speier .................... | F21V 7/0091 362/84 |

FOREIGN PATENT DOCUMENTS

| | | |
|---|---|---|
| WO | WO 2008/144650 | 11/2008 |
| WO | WO 2008/144656 | 11/2008 |
| WO | WO 2008/147753 | 12/2008 |
| WO | WO 2009/105450 | 8/2009 |
| WO | WO 2009/149010 | 12/2009 |
| WO | WO 2009/151842 | 12/2009 |
| WO | WO 2009/151869 | 12/2009 |
| WO | WO 2010/062485 | 6/2010 |
| WO | WO 2010/074862 | 7/2010 |
| WO | WO 2010/117569 | 10/2010 |
| WO | WO 2012/075352 | 6/2012 |
| WO | WO 2012/075384 | 6/2012 |
| WO | WO 2012/109099 | 8/2012 |
| WO | WO 2012/138554 | 10/2012 |
| WO | WO 2012/144268 | 10/2012 |
| WO | WO 2014/070495 | 5/2014 |
| WO | WO 2014/070498 | 5/2014 |
| WO | WO 2014/168781 | 10/2014 |
| WO | WO 2015/034896 | 3/2015 |
| WO | WO 2015/050961 | 4/2015 |

OTHER PUBLICATIONS

3M, "3M Uniformity Tape", May 2011, 11 pgs.
International Search Report for PCT International Application No. PCT/US2014/032644, dated Nov. 25, 2014. 3 pgs.

* cited by examiner

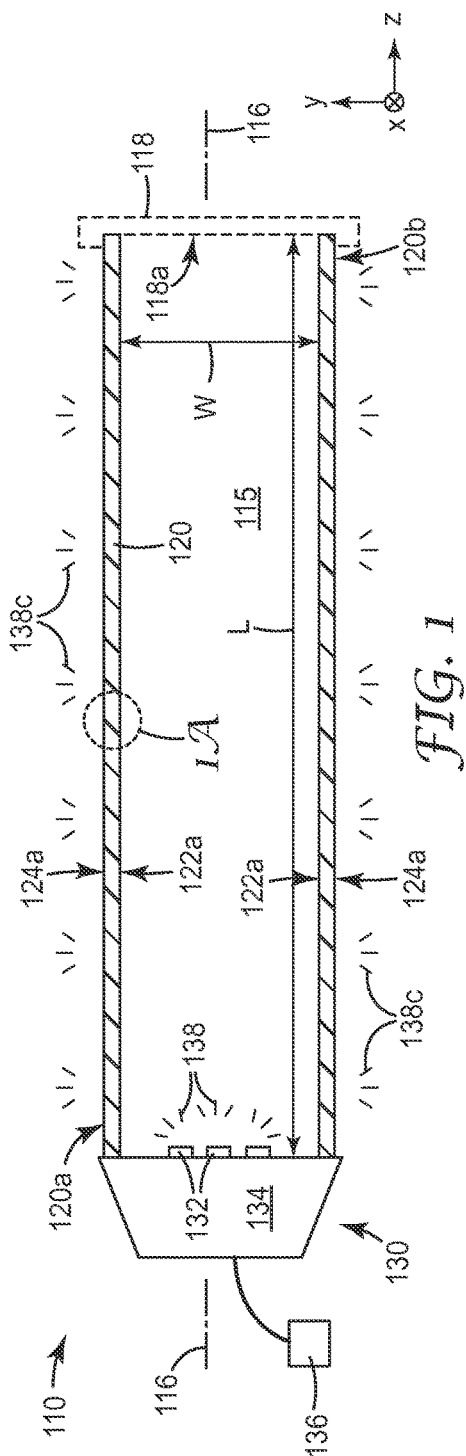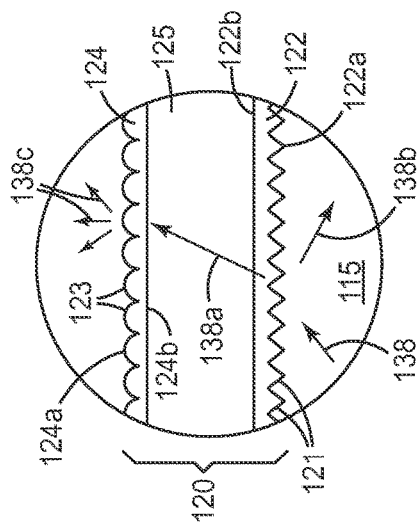
FIG. 1
FIG. 1A

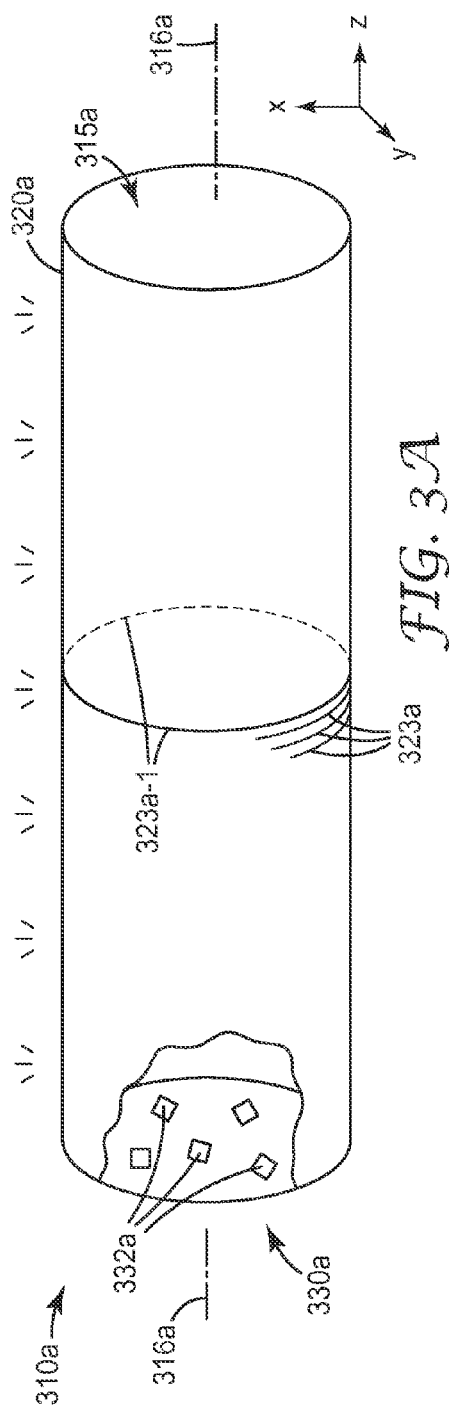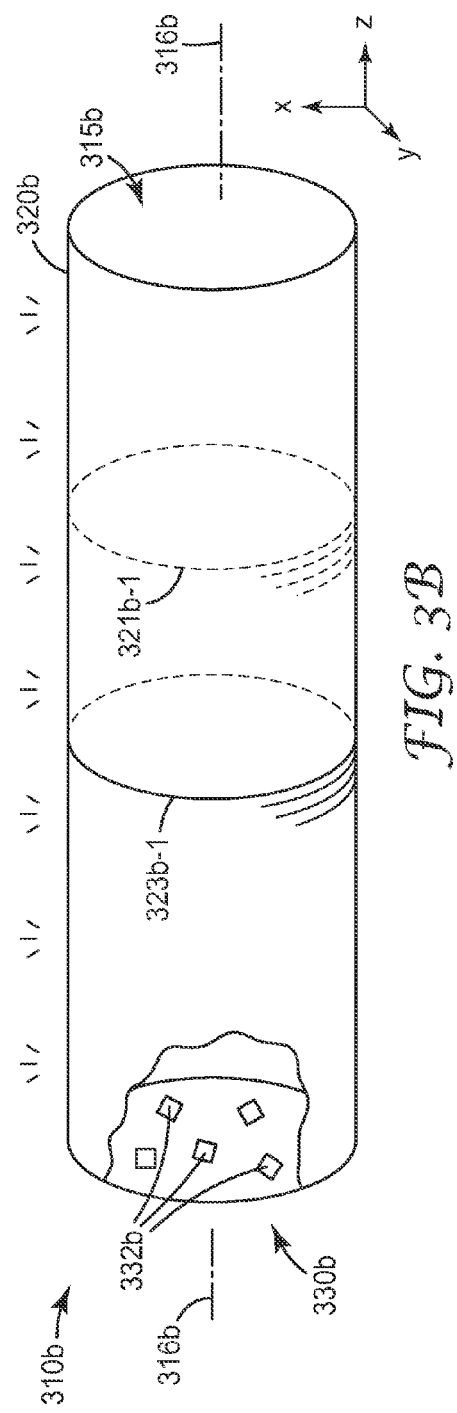

SOLID STATE LIGHTING DEVICE WITH VIRTUAL FILAMENT(S)

CROSS REFERENCE TO RELATED APPLICATIONS

This application is a national stage filing under 35 U.S.C. 371 of PCT/US2014/032644, filed Apr. 2, 2014, which is a continuation-in-part of U.S. Ser. No. 14/188,687, filed Feb. 25, 2014, now granted as U.S. Pat. No. 9,046,637, the disclosures of which are incorporated by reference in their entireties herein.

FIELD OF THE INVENTION

This invention relates generally to lighting systems, with particular application to lighting systems that utilize one or more LED or other solid state light sources. The invention also relates to associated articles, systems, and methods.

BACKGROUND

Recent years have seen a proliferation of new and different lighting devices and systems being introduced for commercial and residential lighting applications. For example, compact fluorescent (CFL) light bulbs of various shapes and sizes are now commercially available, and users are being encouraged to replace Edison-type incandescent bulbs with CFL bulbs to reduce energy demands. Light emitting diodes (LEDs) are also being used in a growing number of applications, from automobile lights to television backlights to general purpose light bulbs. LEDs generate light when electrons combine with holes in a solid semiconductor material. The semiconductor material is typically a small chip or die that is cut from a larger semiconductor wafer, the LED die usually being quite small, e.g. on the order of 1 mm×1 mm in size, such that the (solid state) LED source behaves essentially like a point source of light. The semiconductor die may also be mounted in a reflective cup and/or in a transparent encapsulant whose outer surface may be curved to form a lens, or may be flat.

BRIEF SUMMARY

The small point-like nature of many solid state light sources such as LEDs can pose a challenge to designers of lighting systems who desire both high brightness and spatial uniformity over the emitting area of the system, particularly when the lighting system is in the form of an extended tube.

We have found that some types of spatial non-uniformities can actually provide a design advantage in extended lighting systems and devices, while still providing high brightness. In particular, when a discrete light source such as an LED is positioned to inject light into a cavity formed by one or more tubular-configured optical films having suitably configured structured surface features, the interaction of the injected light with the optical film(s) can produce a light output in the emitting area of the lighting device that has the appearance, to an individual who looks directly at the emitting area, of a bright band or line (whether curved or straight) of increased luminance The band or line is referred to herein as a virtual filament because, at a given viewing geometry, it can appear to reside at a position in space other than the outer surface of the tube formed by the optical film(s) (for example, inside such a tube, or otherwise behind the outer surface of the tube), and/or because, over a range of viewing geometries, the observed band or line can change shape in the same or similar manner as an actual, physical filament located inside the tube. In some embodiments, multiple discrete light sources can be used to produce a pattern of such virtual filaments. The unique appearance and behavior of the virtual filament(s) enhances the value of the disclosed lighting devices. The emitting area of the device may be the entire outer surface of the tube that is viewable from a given perspective, or in some cases it may be only a portion of that outer surface, such as a slit or aperture that runs longitudinally along the tube. The tube may be circular in cross-section, or it can have a cross-sectional shape that is not circular, as well as a shape that is not smoothly curved.

We therefore describe herein, among other things, lighting systems or devices that include a light-transmissive tube and a light source assembly. The light-transmissive tube defines a cavity that extends along a longitudinal axis, at least a portion of the tube having an inner structured surface facing the cavity, and an outer structured surface facing away from the cavity. The light source assembly is disposed to inject light into the cavity, and includes one or more discrete light sources such as LED sources. The inner and outer structured surfaces of the tube are configured to direct a first portion of the injected light out of the tube through the outer structured surface and to direct a second portion of the injected light back into the cavity, such that a virtual filament appears in the tube.

The virtual filament may change shape as a function of azimuthal observation angle. The virtual filament may have a curved shape at a first azimuthal observation angle, and a straight shape at a second azimuthal observation angle. The virtual filament may have first and second curved shapes respectively at first and second azimuthal observation angles, and the first and second curved shapes may be oppositely curved.

The portion of the tube may also include a curved portion having a center of curvature, and the one or more discrete LED sources may include a first discrete LED source that is not disposed at the center of curvature. The one or more discrete LED sources may also include a second discrete LED source, and the second discrete LED source may be disposed closer to the center of curvature than the first discrete LED source. The virtual filament may be one of a plurality of virtual filaments including first and second virtual filaments that are distinct from each other, and the first and second discrete LED sources may be sufficiently separated from each other so that they produce respectively the first and second virtual filaments.

The virtual filament may be one of a plurality of virtual filaments that form a virtual filament pattern. At least some of the virtual filaments in the virtual filament pattern may change shape as a function of azimuthal observation angle. At least one of the virtual filaments in the virtual filament pattern may not substantially change shape as a function of azimuthal observation angle.

The one or more discrete LED sources may include a first discrete LED source, and light from the first discrete LED may produce the virtual filament. The inner structured surface of the tube may include first elongated features and the outer structured surface of the tube may include second elongated features, the first elongated features being oriented at a first angle relative to the longitudinal axis and the second elongated features being oriented at a second angle relative to the longitudinal axis. The first and second angles may each have a magnitude within a range from 80 to 100 degrees, or from 85 to 95 degrees, or substantially 90 degrees. One or both of the first and second elongated features may be or include lenticular features. The first elongated features may be or include lenticular features, and the second elongated features be or include prismatic features. Alternatively, both the first and second elongated features may be or include lenticular features. In some cases, at least one of the elongated first features and the elongated second features include a shape characterized by a cubic Bezier function.

The tube may be or include distinct first and second structured films, and the first structured film may include the inner structured surface and the second structured film may include the outer structured surface. Alternatively, the tube may be or include a structured film with opposed first and second major surfaces, and the first major surface may include the inner structured surface and the second major surface may include the outer structured surface.

The light-transmissive tube may be a first light-transmissive tube, the longitudinal axis may be a first longitudinal axis, the inner structured surface may be a first inner structured surface, the outer structured surface may be a first outer structured surface, the cavity may be a first cavity, the light source assembly may be a first light source assembly, and the one or more discrete LED sources may be one or more discrete first LED sources, and the device may also include: a second light-transmissive tube defining a second cavity that extends along a second longitudinal axis parallel to the first longitudinal axis, at least a portion of the second tube including a second inner structured surface facing the second cavity, and a second outer structured surface facing away from the second cavity; and a second light source assembly disposed to inject light into the second cavity, the second light source assembly including one or more discrete second LED sources; and the second inner structured surface and the second outer structured surface may be configured to direct a third portion of the injected light out of the second tube through the outer structured surface and to direct a fourth portion of the injected light back into the second cavity, such that a second virtual filament appears in the second tube.

The device may also include a first highly reflective optical film that partially surrounds the cavity to provide at least a first elongated aperture for the lighting device, the virtual filament being visible in the first elongated aperture. The inner and outer structured surfaces may be included on a first strip of at least one structured film, and the first highly reflective optical film may be or include a second strip, and the first and second strips may partially overlap to define an overlap region, and attach to each other along the overlap region. The device may also include a second highly reflective optical film that partially surrounds the cavity to provide at least a second elongated aperture for the lighting system different from the first elongated aperture, and the virtual filament may also be visible in the second elongated aperture.

The virtual filament, whether alone or in a pattern of filaments, may be a continuous, smooth curve or line. Alternatively, the virtual filament (whether alone or in a pattern) may be discontinuous.

Other aspects of the invention can be found in the appended claims and the detailed description that follows.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 1 is a schematic side or sectional view of a lighting device or system, and FIG. 1A is an enlarged view of a portion of that lighting device;

FIG. 3A is a schematic perspective view of another lighting device, where elongated features of an outer or inner structured surface are schematically illustrated;

FIG. 3B is a schematic perspective view of another lighting device, where an elongated feature of an outer structured surface, and an elongated feature of an inner structured surface, are schematically illustrated;

In the figures, like reference numerals designate like elements.

DETAILED DESCRIPTION OF ILLUSTRATIVE EMBODIMENTS

Figure 2:
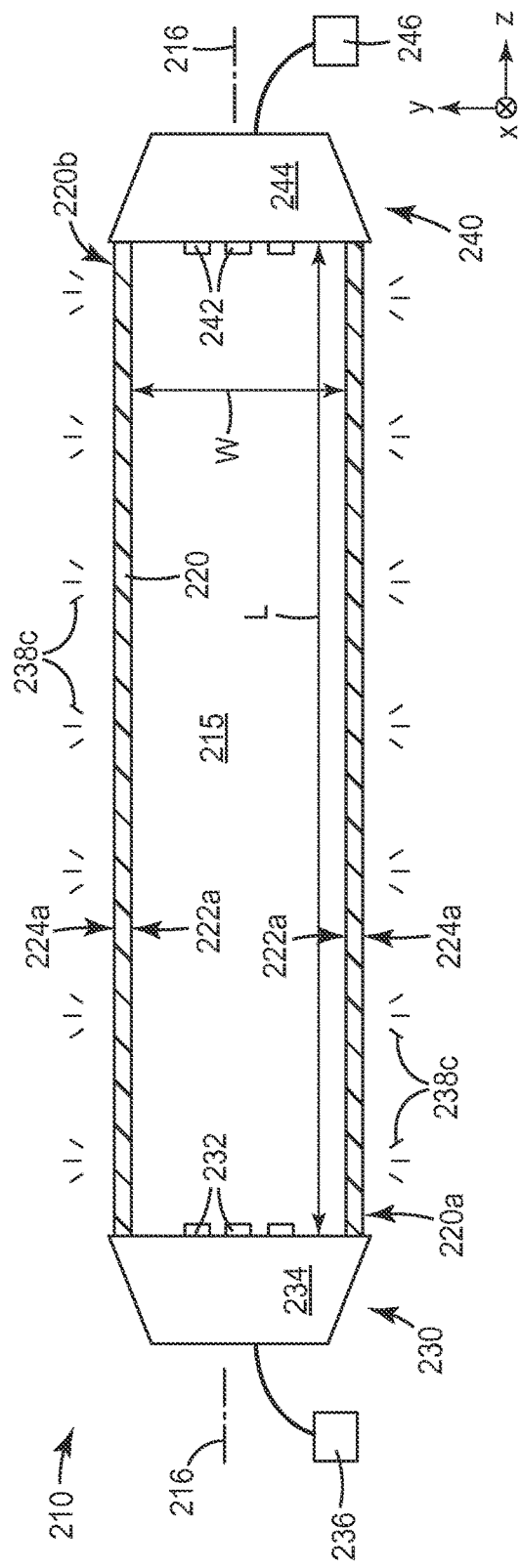
FIG. 2 is a schematic side or sectional view of another lighting device.

We have developed new lighting devices and systems that have a generally tubular configuration, that can be used with one or more discrete solid state light sources such as LEDs, and that incorporate structured surfaces on an inside-facing surface and on an outside-facing surface of the tube, these structured surfaces having linear or otherwise elongated surface features. Light injected into the tube from the discrete light source(s) interacts with the elongated surface features to produce a light output in the emitting area of the lighting device that has the appearance, e.g. to an individual who looks directly at the emitting area, of bright band(s) or line(s) of increased luminance, which we refer to as virtual filament(s) for reasons discussed above. The elongated surface features, in combination with the discrete light source(s), can provide the virtual filament(s) in the emitting area of the tube while also providing a high overall brightness. The tube can be made in a variety of different shapes and sizes, and may have a variety of different component parts and construction configurations, as described further below. The tube need not have a circular cross-sectional shape. The disclosed lighting devices and systems can be used as-is in general lighting applications, e.g., as replacements for conventional light bulbs, including cases in which the emitting area of the tube is exposed and visible to a user such as an occupant of a room illuminated by such a lighting system. Alternatively, the disclosed lighting devices can be used as a component part in a bulb, fixture, or the like.

In FIG. 1, a lighting device 110 has a generally tubular construction. For ease of explanation, the device 110 is shown in the context of a Cartesian x-y-z coordinate system. The device 110 includes a light-transmissive tube 120 that defines an interior volume or cavity 115. The cavity 115 may be completely enclosed, or it may be only partially enclosed, such as when the tube 120 is open or uncovered on one end. The tube 120 may have a shape that is circular, or substantially circular, in transverse cross section (e.g. in the x-y plane), or it may have a non-circular shape that may be smoothly curved, or polygonal, or a combination of curved and polygonal. The cross-sectional shape is typically constant and uniform along all or most of its length from a proximal end 120a to a distal end 120b of the tube, but in some cases the shape may not be constant.

The tube 120 and the cavity 115 each extend along a shared longitudinal axis 116, which is parallel to the z-axis of the coordinate system. Macroscopically, the tube 120 and the cavity 115 may be described in terms of their absolute dimensions, and/or their relative dimensions such as aspect ratio. In FIG. 1, L refers to the longitudinal dimension (length) of both the tube 120 and the cavity 115. W refers to the transverse dimension (width or diameter, where diameter is understood broadly to refer to the maximum transverse dimension of any closed shape, not limited to circles) of the cavity 115. In many cases, the walls of the tube 120 are so thin compared to the cavity width W that W can also be used to approximate the width of the tube 120. The aspect ratio of the cavity 115 and tube 120 may thus both equal, or substantially equal, L/W. The lighting device 110 is not particularly limited, but for a typical embodiment the aspect ratio may fall within a range from at least 1 up to 250, or from at least 1 up to 240, or from at least 1 up to 120, or from at least 1 up to 60, or from at least 1 up to 40 or 20. To emphasize or draw attention to the virtual filament or pattern of virtual filaments, it may be advantageous to keep the aspect ratio relatively low, e.g., less than 5, or less than 4, or less than 3, or less than 2, and in some cases even less than 1, i.e., between 0 and 1. The tube 120 and cavity 115 may also possess certain symmetries, for example, rotational symmetry about the axis 116, and/or mirror symmetry about a plane that contains the axis 116.

A light source assembly 130 is attached to, or otherwise positioned at or near, the proximal end 120a of the tube 120 in order to inject light 138 into the cavity 115. This light injection arrangement is in contrast to a typical light guide, in which the light source injects light into the edge of a solid plate or film. Depending on design details of the assembly 130 and its constituent light source(s), the injected light 138 may be broadband or narrow band, and highly collimated or uncollimated. Furthermore, although most embodiments use injected light 138 that is chiefly or exclusively in the visible spectrum, in some cases the light 138 may be or include ultraviolet light, in combination with a layer or film of phosphor or other down-converting material which absorbs the ultraviolet light and emits the absorbed energy as visible light. The injected light may also comprise infrared light.

The assembly 130 includes one or more discrete, individual light sources 132, which are preferably light emitting diodes (LEDs) or other solid state light sources. In this regard, a "light emitting diode" or "LED" refers to a diode that emits light, whether visible, ultraviolet, or infrared, although in most practical embodiments the emitted light will have a peak wavelength in the visible spectrum, e.g. from about 400 to 700 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. Some packaged LEDs also include one or more phosphor materials that are excited by an ultraviolet or short wavelength visible LED die, and fluoresce at one or more wavelengths in the visible spectrum. An "LED" for purposes of this application should also be considered to include organic light emitting diodes, commonly referred to as OLEDs.

The light sources 132 are mounted on a header or base 134. The base 134 may serve both a mechanical function of keeping the sources 132 in physical alignment and position, and a thermal function of conducting heat away from the sources 132 so they can function at lower operating temperatures. The base 134 may further serve an electrical function of providing electrical connections from a controller 136 to the sources 132. In some cases, the base 134 or other component of the lighting device 110 may also include one or more optical detectors (not shown in FIG. 1), and the output of such detector(s) may then be fed to the controller 136 so the controller can drive the light sources 132 in a closed feedback loop, e.g. to maintain a constant intensity output of the light source assembly 130 and lighting device 110. Although multiple light sources 132 are shown in FIG. 1, the reader will understand that the assembly 130 may include only one such light source 132. If multiple light sources 132 are used, some or all of them may provide substantially the same emission spectrum—i.e., any differences in their emission spectra may be minor, such as is typical for unit-to-unit variability; for example, sources that all emit nominally green visible light would be considered to be emitting substantially the same emission spectrum. Alternatively or in addition, some or all of the multiple light sources may provide substantially different emission spectra—i.e., the differences in their emission spectra may be greater than typical unit-to-unit variability; for example, a group of three sources, one emitting nominally red light, another emitting nominally green light, and the last emitting nominally blue light, would be considered to be emitting substantially different emission spectra.

As mentioned above, LEDs and similar solid state light sources are typically quite small. The transverse dimension of each of the individual light sources 132 may therefore be a small fraction of the transverse dimension W of the cavity 115 and tube 120. For example, the transverse dimension of each light source 132 may be $\frac{1}{5}^{th}$ or less, or $\frac{1}{10}^{th}$ or less, or $\frac{1}{20}^{th}$ or less, of the transverse dimension W.

Numerous factors can impact the spatial uniformity/non-uniformity and overall brightness of a tubular lighting system. Such factors can include the number, position(s), emission spectra, and output distribution(s) of the individual light source(s), the tube or cavity length and width (and aspect ratio), and whether the distal end of the tube is covered with a reflective cap such as optional cap 118 in FIG. 1, and if so, what the reflectivity is of the reflective interior surface 118a of the cap 118. Other factors that can be important are design details of the tube. In the disclosed systems, the tube is light transmissive, which means at least a portion of the tube transmits light. In some cases, the entire tube, or substantially the entire tube, transmits light, while in other cases, another film or films may be used to define one or more longitudinal light-transmissive apertures, discussed further below. At least a portion of the light transmissive part of the tube includes an inner structured surface that faces the cavity, and an outer structured surface that faces away from the cavity. These inner and outer structured surfaces cooperate so that the light 138 injected into the cavity by the light source assembly is emitted as output light 138c along the tube of the lighting system. In this regard, as best seen in the enlarged view of FIG. 1A, the inner structured surface 122a is configured to direct a first portion 138a of the injected light 138 towards the outer structured surface 124a, and to direct a second portion 138b of the injected light 138 back into the cavity 115. The portion 138b directed back into the cavity helps to provide illumination at more distal portions of the tube 120. The portion 138a is mostly, or at least partially, transmitted—as well as defocused and/or focused and/or otherwise redirected—by the outer structured surface 124a to provide the output light 138c.

In the disclosed lighting devices and systems, the inner and outer structured surfaces incorporate linear or otherwise elongated surface features, such as elongated prismatic or lenticular (lens-like) structures. The elongated structures or features can in some cases have an indefinite or unlimited length, and in other cases they may be interrupted or discontinuous along their length. In FIG. 1A, inner structured surface 122a includes elongated features 121, and outer structured surface 124a includes elongated features 123. In the embodiment shown, the elongated features 121 are prismatic, with substantially planar side surfaces and a relatively sharp peak, and the elongated features 123 are lenticular, with substantially curved surfaces and a more rounded peak. The linear or elongated nature of the elongated features 121, 123 is not apparent in the cross-sectional view of FIG. 1A. Nevertheless, the features 121, 123 are linear or otherwise elongated along respective axes in a given vicinity of the tube 120. And one or both of these features are oriented relative to the longitudinal axis such that they provide the virtual filaments along the tube 120. This is discussed more fully and shown below in FIG. 3A and following. The tube 120 can be constructed in numerous possible ways. In FIG. 1A, it is shown as having a 3-part construction: a reinforcing cylinder or sleeve 125, an inner structured film 122, and an outer structured film 124. The inner and outer structured films 122, 124 each have one major surface that is structured and an opposed major surface that is flat or smooth. The flat major surface of these films can be attached to smooth inner and outer surfaces of the sleeve 125, e.g. using an optically clear adhesive or other suitable bonding agent. Other possible constructions of the tube are discussed below starting with FIG. 15.

The tube 120 may optionally include a cap such as cap 118 that fully or partially closes the distal end 120b of the tube, and that causes the cavity 115 to be a closed cavity rather than an open cavity. Such a cap 118 would typically include an inner surface 118a that at least partially reflects the injected light 138, and may have a high reflectivity for such light. The reflectivity of the surface 118a may be specular, diffuse, or semi-specular, as discussed further below. The reflective surface 118a of the cap 118 causes at least some light that would otherwise be emitted from the distal end 120b of the tube to be reflected back into the cavity 115. The structured surfaces 122a, 124a can then intercept such light and direct it out of the tube, in order to increase the intensity of the output light 138c. Exemplary optical films that are partially transmissive and partially reflective (sometimes referred to as "transflective") include but are not limited to: reflective polarizers, including both linear polarizers (e.g., 3M™ Vikuiti™ Dual Brightness Enhancement Film (DBEF)) and circular polarizers, and including both specularly reflective polarizers and diffusely reflective polarizers (e.g. 3M™ Vikuiti™ Diffuse Reflective Polarizer Film (DRPF)); multilayer optical films and other optical films that have intermediate levels of reflectivity and transmission, e.g. 25% to 75%, for any given polarization of light; and optical films, including highly reflective optical films, that are perforated to provide significant light transmission. Additional transflective films are discussed in U.S. Pat. No. 7,537,374 (Schardt et al.) and U.S. Pat. No. 7,815,355 (Thompson et al.). Exemplary optical films that are highly reflective, e.g. having at least 90% reflectivity and little or no light transmission, include both specular reflectors such as 3M™ Vikuiti™ Enhanced Specular Reflector (ESR) film, and diffuse reflectors. Combinations of any of the foregoing optical films can also be used for the cap 118.

If the cap 118 is omitted, the tube 120 may be open-ended. Alternatively, another light source assembly may be placed at that end of the tube, opposite the light source assembly 130. Such an embodiment is shown in FIG. 2. In that figure, a lighting device 210 also has a generally tubular construction. The lighting device 210 is shown in the context of a Cartesian x-y-z coordinate system in the same manner as FIG. 1. The lighting device 210 includes: a light-transmissive tube 220 that defines an interior volume or cavity 215 and has a proximal end 220a, a distal end 220b, and a longitudinal axis 216, the cavity and/or the tube having a longitudinal and transverse dimension L and W; an inner structured surface 222a facing the cavity 215 and an outer structured surface 224a facing away from the cavity 215; a light source assembly 230 having one or more discrete, solid state light sources 232 mounted on a header or base 234, and connected to a controller 236. These elements may be the same as or similar to their counterparts in the embodiment of FIG. 1, and to avoid needless repetition will not be discussed further here.

In addition to the light source assembly 230 at the proximal end 220a, the lighting device 210 also includes a second light source assembly 240 at the opposite or distal end 220b of the tube 220. The light source assembly 240 may have substantially the same construction and design as the assembly 230, or it may be substantially different. For example, the assemblies 230, 240 may have the same number of individual light sources 232, 242, and they may emit substantially the same color or spectral distribution of light, and substantially the same brightness of light, and they may emit light in substantially the same output distribution (degree of collimation), or alternatively any one, some, or all of these design factors may be substantially different for the two assemblies 230, 240. For simplicity, FIG. 2 shows the assembly 240 as having the same or similar construction as assembly 230: the assembly 240 includes one or more light sources 242 mounted on a header or base 244, and connected to and controlled by a controller 246. The light sources 242, base 244, and controller 246 may be the same as or similar to light sources 232, base 234, and controller 236, respectively. Thus, the light source assembly 230 injects light into the cavity 215 from the proximal end 220a, and light source assembly 240 injects light into the cavity 215 from the distal end 220b.

Just as in lighting device 110, the inner and outer structured surfaces 222a, 224a of lighting device 210 cooperate so that the light injected into the cavity by the light source assembly 230, as well as the light injected into the cavity by the light source assembly 240, is emitted as output light 238c along the tube of the lighting device. The inner structured surface 222a is configured to direct a first portion of such injected light towards the outer structured surface 224a, and to direct a second portion of the injected light back into the cavity 215. The portion directed back into the cavity helps to provide illumination at portions of the tube 220 farther from the light source at issue. The light portion that is directed from the inner structured surface 222a to the outer structured surface is mostly, or at least partially, transmitted—as well as defocused and/or focused and/or otherwise redirected—by the outer structured surface 224a to provide the output light 238c. Virtual filaments can be produced both at the proximal end 220a by discrete light sources 232 of the light source assembly 230, and at the distal end 220b by discrete light sources 242 of the light source assembly 240.

The lighting systems of FIGS. 1 and 2, and the other lighting systems disclosed herein, may have a modular construction such that parts of the lighting system are separable from each other to allow for replacement by other parts, and/or, at the time of purchase, can be offered as a kit or other collection of different parts so the buyer of the lighting system can select which parts to combine. For example, the buyer may purchase, or may be presented with, a collection of tube types, e.g. having different lengths and aspect ratios, and/or having different structured surface geometries and/or orientations, as well as a collection of light source assemblies, e.g. having different numbers of LEDs and/or different LED types (different output spectra and/or different angular output distributions). The buyer may then make selections from these collections of different parts and combine the selected parts into a lighting system designed for the buyer's particular application. A kit or other collection of parts associated with the disclosed lighting devices may thus be sold, offered, or otherwise provided, such kit or collection including: one or more discrete light sources, optionally grouped or packaged as one or more light source assemblies; one or more sleeves of different lengths, widths, and aspect ratios; one or more structured surface optical films suitable for forming all or a part of a light-transmissive tube and providing at least two oppositely facing structured surfaces, such structured surfaces including elongated surface features such as lenticular features or prismatic features; and optionally one or more transflective or highly reflective caps for attaching to one end of the light-transmissive tube(s).

As mentioned above, the inward-facing and outward-facing structured surfaces of the tube have linear or otherwise elongated surface features, and the surface features of these structured surfaces extend along respective axes that are oriented relative to the longitudinal axis of the tube such that they produce virtual filaments in the output light along the tube. One suitable arrangement of structured surface features is shown schematically in FIG. 3A.

In that figure, a lighting device 310a includes a light source assembly 330a coupled to a light transmissive tube 320a. The tube 320a, which may be open-ended or closed-ended, defines a cavity 315a and has a longitudinal axis 316a, as well as inward- and outward-facing structured surfaces (not labeled). The light source assembly 330a has individual, discrete light sources 332a, such as LEDs, that inject light into the cavity 315a. The inward-facing structured surface directs a first portion of the injected light towards the outward-facing structured surface, and directs a second portion of the injected light back into the cavity 315a. The outward-facing structured surface defocuses, focuses, or otherwise redirects most or at least some of the light transmitted by the inward-facing structured surface, and directs it generally outward from the tube 320a, to produce the output light of the lighting system 310a, as discussed above in connection with FIGS. 1 and 2. The light directing or redirecting properties of the inward- and outward-facing structured surfaces may be the result of reflection and/or refraction, and in some cases diffraction, from the respective surface features on such surfaces.

The sizes of the individual surface features on the inward- and outward-facing structured surfaces are typically very small, e.g., in many cases the spacing of the individual surface features on a given structured surface is less than 1 mm, or less than 0.5 mm, or less than 0.25 mm, or even less than 0.1 mm. In such cases a user or viewer of the lighting device may very well not notice, and may not be able to easily detect, the topography of these inner and/or outer structured surfaces. Nevertheless, the elongated surface features of both of these structured surfaces are desirably oriented transverse to the longitudinal axis of the tube or cavity, e.g. at a substantial 90 degree angle thereto, or at an angle in the range from 80 to 100 degrees, or 85 to 95 degrees, or in some cases at another angle including even 45 degrees. In cases where the angle between a given elongated surface feature and the longitudinal axis is less than 90 degrees but greater than 0 degrees, such a surface feature forms a spiral or helix as it winds its way along the tube. In FIG. 3A, individual surface features are represented schematically by reference numeral 323a. Only a representative few of the surface features 323a are shown in the drawing for clarity, but the reader will understand that the features may occupy the entire major surface of the structured surface at issue. The surface features 323a may represent surface features on the outward-facing structured surface, or on the inward-facing structured surface of the tube 320a. In the embodiment shown, at any given point or localized area on the structured surface, the surface features 323a are oriented substantially orthogonally relative to the longitudinal axis 316a, and as a result, these features form a set of non-intersecting (circular or non-circular) rings around the tube 320a. From the group of surface features 323a, one surface feature 323a-1 is singled out and drawn in its entirety around the circumference of the tube, for clarity. Note, however, that in some embodiments the inner and outer structured surfaces may form only a part of the tube, e.g. as shown and discussed further below they may form only one, or several, isolated longitudinal light-emitting apertures along the tube. But even in such cases the surface features can be said to be oriented transversely relative to the longitudinal axis, and, if the relative angle is different from 90 degrees, a given surface feature can be said to form a helix, even though the helix may form only a fraction (e.g., less than half) of one complete turn around the tube.

FIG. 3B is a schematic view of another tubular lighting device 310b. The lighting device 310b may be the same as or similar to lighting device 310a of FIG. 3A. The lighting device 310b includes a light source assembly 330b (with individual LED or solid state light sources 332b) coupled to a light transmissive tube 320b, which may be open-ended or closed-ended, and which defines a cavity 315b and a longitudinal axis 316b, as well as inward- and outward-facing structured surfaces (not labeled). The tube 320b and assembly 330b may be the same as or similar to corresponding components of the lighting device 310a, and to avoid needless repetition all pertinent aspects of these components need not be repeated here. But the inward- and outward-facing structured surfaces of the tube 320b cooperate to receive light from the light source assembly and direct it outwardly from an emitting area of the tube, as discussed above, and these structured surfaces may occupy the entire outer surface of the tube, or, in some embodiments, only one or more isolated emitting apertures.

In FIG. 3B, for ease of explanation, one surface feature 323b-1 from the outward-facing structured surface is shown isolated from its set of surface features, and one surface feature 321b-1 from the inward-facing structured surface is shown isolated from its set of surface features, on the surface of the tube 320b. In this embodiment, the surface features of the outward-facing structured surface (including surface feature 323b-1) and the surface features of the inward-facing structured surface (including surface feature 321b-1) are all oriented substantially orthogonally relative to the longitudinal axis 316b, and thus form two sets of ring-shaped structures. We may refer to an angle of intersection between the sets of surface features, even though the surface features on the inward-facing structured surface do not physically intersect the surface features on the outward-facing structured surface. In the embodiment of FIG. 3B, the angle of intersection is substantially 0 degrees (or 180 degrees), because the set of surface features on the inward-facing structured surface are substantially parallel to those on the outward-facing structured surface. The two sets of surface features in this embodiment may be said to be oriented symmetrically about the longitudinal axis 316b, and the axis 316b may be said to bisect the angle of intersection (i.e., bisecting a 180 degree angle) between the sets of features. Symmetry can also be achieved in alternative embodiments in which the sets of surface features are oriented obliquely such that they form helixes and have a relative intersection angle greater than 0 but less than 180 degrees, provided the sets of surface features are oriented symmetrically about the longitudinal axis 316b, such that the axis 316b bisects the angle of intersection between the sets of features. In still other embodiments, the sets of surface features may be oriented asymmetrically with respect to the longitudinal axis.

As mentioned above, the interaction of injected light from a discrete light source with the structured surfaces of the inward-facing and outward-facing structured surfaces can produce a light output in the emitting area of the lighting device that has the appearance of one or more virtual filaments. Some such virtual filaments are illustrated schematically in FIGS. 4A through 4C. To avoid excessive detail in the drawings, the elongated structured features of the inward- and outward-facing structured surfaces are not shown in these figures, but their orientations relative to each other, and to the longitudinal axis of the tube, are described elsewhere herein. Thus, for example, the tubular lighting device 410 of FIG. 4A may be the same as or similar to any of those in FIGS. 1 through 3B, and as such, it includes a light transmissive tube 420 that defines a cavity 415 and a longitudinal axis 416. The tube 420 includes one or more optical films that provide the inward-facing and outward-facing structured surfaces discussed further below. To the tube 420 is coupled a light source assembly having discrete solid state light sources 432a, 432b, 432c, these light sources emitting light that is injected into the cavity 415. The light source 432b is assumed to be located on or near the longitudinal axis 416, which in this particular embodiment may also be a center of curvature (axis of curvature) of the tube 420. The other light sources 432a, 432c are assumed to be separated a substantial distance from the axis 416. For simplicity, the light sources 432a, 432b, 432c are also assumed to lie along a straight line that includes reference points 427a, 427b on opposite sides of the tube 420.

Figure 4A:
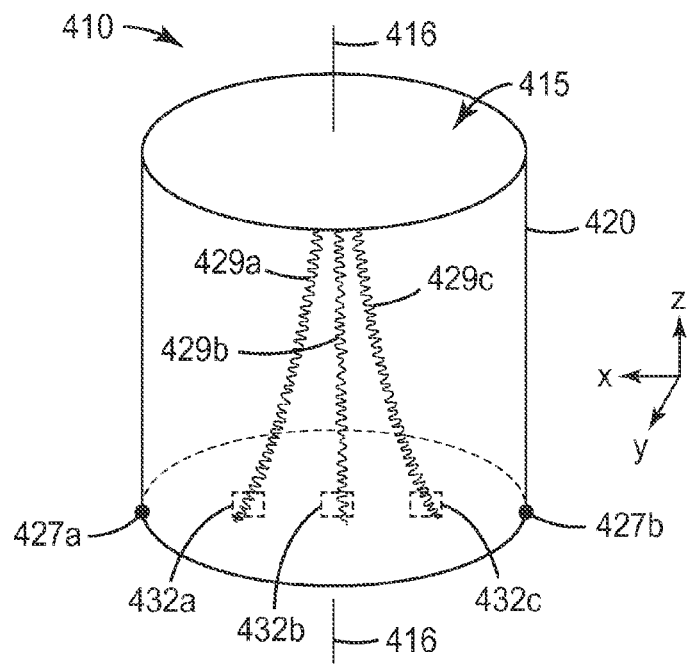
FIG. 4A is a schematic perspective view of a lighting device that shows a plurality of virtual filaments.

In the orientation of FIG. 4A, an observer who looks directly at the output area of the lighting device 410, by virtue of the varying angular distribution of the output light emitted at different positions on the tube 420, sees three distinct virtual filaments 429a, 429b, 429c. These virtual filaments appear to be located inside the tube 420, and are associated with, and appear to extend from, the respective light sources 432a, 432b, 432c as shown. In this regard, if the light sources emit different colors of light, then their corresponding filaments have the corresponding (different) colors of light. With regard to shape, the filaments 429a and 429c have shapes that are curved in opposite directions, while the filament 429b has a substantially straight shape that is not curved due to the position of the light source 432b on the axis (and center of curvature) 416.

Figure 4B:
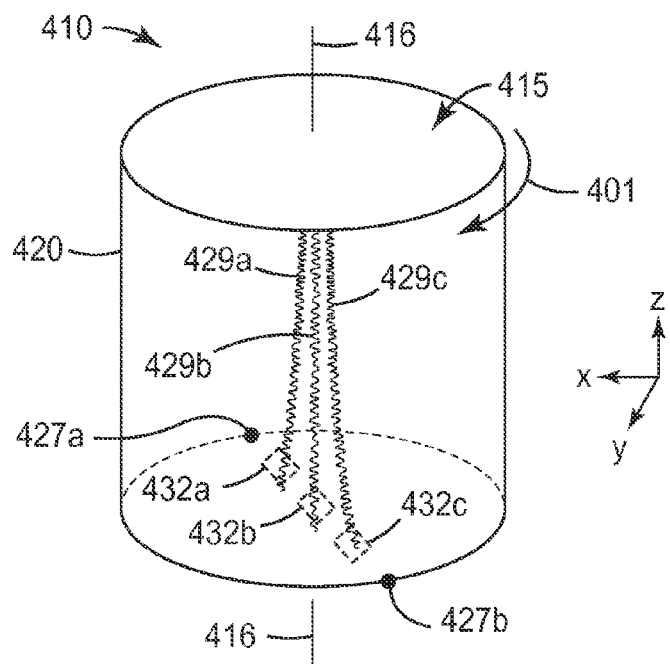
FIGS. 4B and 4C show how some of the virtual filaments change shape as a function of the azimuthal observation angle.
Figure 4C:
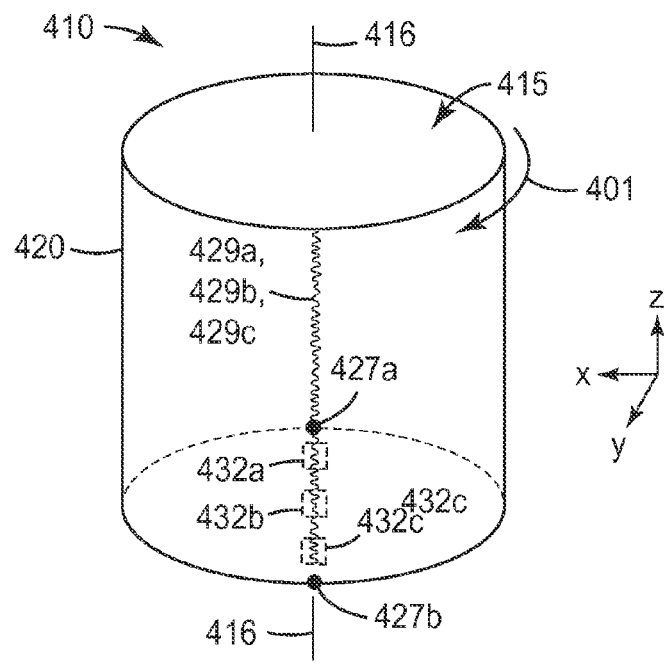

FIGS. 4B and 4C schematically illustrate how the shapes of some of the virtual filaments change as a function of azimuthal observation angle. The polar angle is assumed to be constant in this series of figures. FIGS. 4B and 4C show the same lighting device 410 as that of FIG. 4A, but the orientation of the device relative to the observer is different with regard to azimuthal angle as a result of rotating the device 410 about the longitudinal axis 416 as indicated by the arrow 401. Corresponding elements in the figures have corresponding descriptions, which will not be needlessly repeated. In FIG. 4B, the lighting device 410 has been rotated such that the virtual filaments appear closer together, and the outer filaments 429a, 429c have reduced curvatures (are closer to being straight) than in FIG. 4A but are still oppositely curved. The central virtual filament 429b remains straight, just as in the orientation of FIG. 4A. In FIG. 4C, the lighting device 410 has been azimuthally rotated to such an extent that the line that connects the reference points 427a, 427b lies in the observation plane. In this orientation, the virtual filaments 429a, 429b, 429c substantially overlap or coincide with each other to form a single straight shape. If the lighting device 410 is rotated still more, the virtual filaments will separate and again become distinct, and each of the outer virtual filaments will assume a shape that is oppositely curved relative to its curvature shown in FIGS. 4A and 4B.

As suggested by FIGS. 4A through 4C, the virtual filament or filaments are typically visible (to an observer located outside the lighting device) at least in the portion of the output area of the lighting device occupied by the outward-facing structured surface. In some cases, see e.g. FIG. 28B below, other portions of the output area, such as the endcap (if present, and if visible from the perspective of the observer), may exhibit no virtual filament(s) at any observation geometry. In the portion of the output area where virtual filament(s) are visible from at least some perspectives, the appearance, shape, number, and/or visibility (including presence or absence) of the virtual filament(s) may be dependent on the observation geometry such as azimuthal angle, polar angle, and distance from the lighting device.

Figure 5:
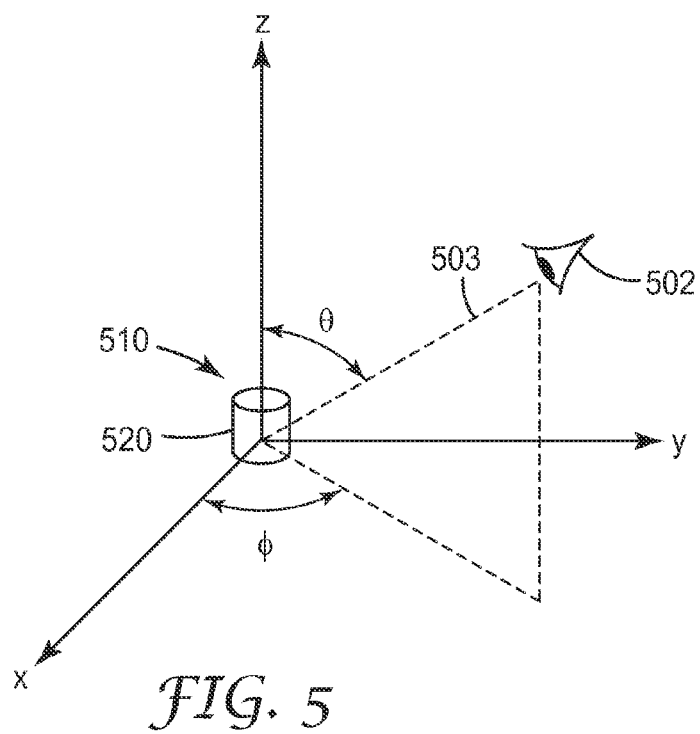
FIG. 5 is a schematic view that illustrates azimuthal angle and polar angle of a given viewing geometry or observation position.

For clarity, FIG. 5 is provided to illustrate the distinction between an azimuthal angle and a polar angle as discussed herein. An observer 502 views a lighting device 510 along a line-of-sight or observation axis 503. The lighting device 510 may be the same as or similar to any of the lighting devices disclosed herein, and has a light-transmissive tube 520 with suitable structured surfaces as discussed herein. The tube 520 defines a cavity and a longitudinal axis. An x-y-z coordinate system is imposed on the arrangement such that the z-axis is coincident with the longitudinal axis of the tube 520, and the x-y plane is perpendicular to the longitudinal axis, and passes through the tube 520. The azimuthal angle associated with this viewing geometry is labeled $\phi$ (phi), and refers to the angle in the x-y plane between the projection of the observation axis 503 in the x-y plane and a suitable reference axis in the x-y plane, such as the x-axis (as illustrated) or the y-axis. The polar angle associated with the illustrated viewing geometry is labeled $\theta$ (theta), and refers to the angle between the z-axis (or longitudinal axis of the tube) and the observation axis 503.

Figure 6:
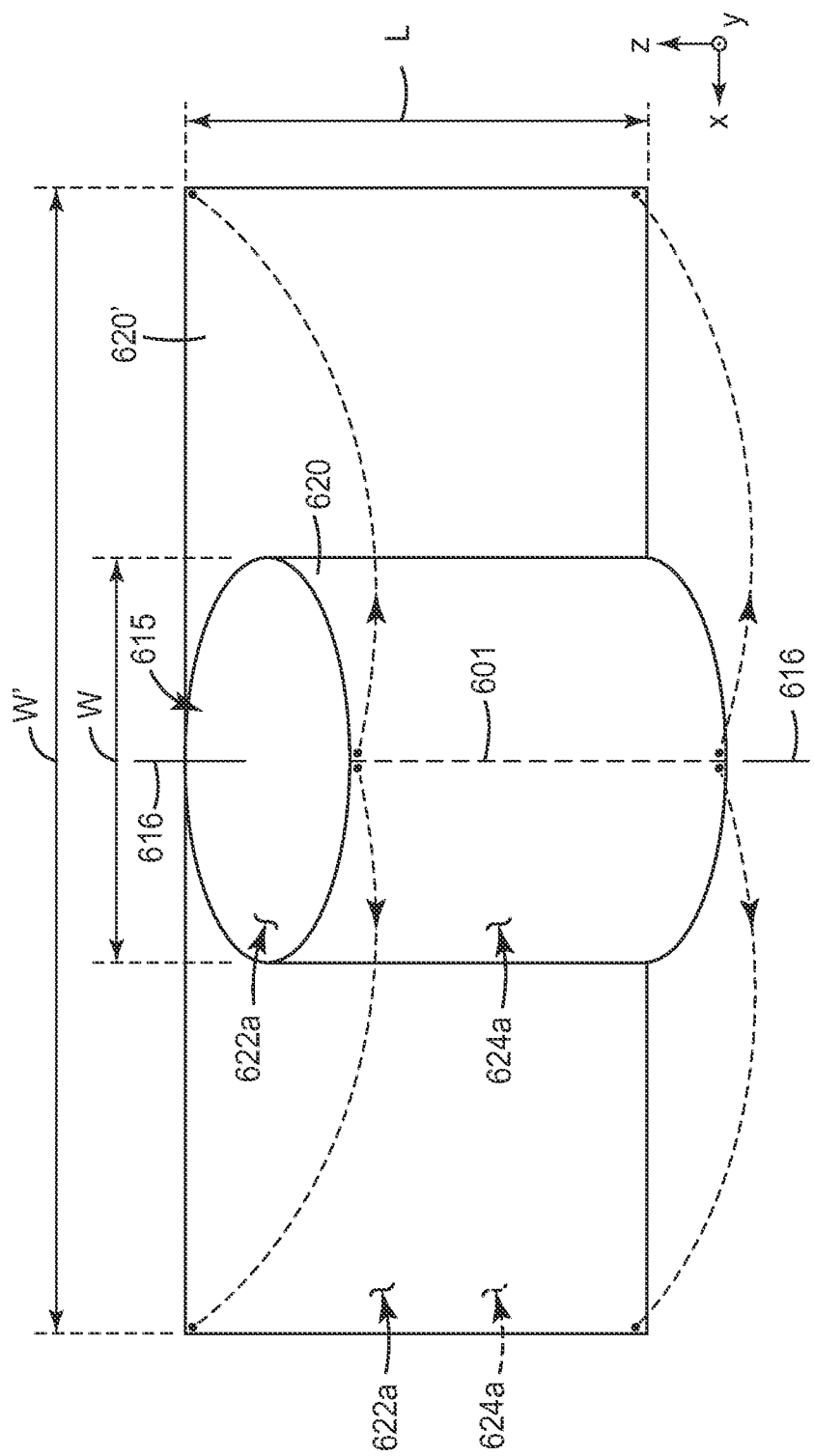
FIG. 6 is a schematic perspective view of a light transmissive tube suitable for use in the disclosed lighting devices, the figure also showing how the tube can be slit along its length so that the film or films forming the tube can be laid flat in order to more clearly describe the structured surfaces of such film(s)

The various orientations of the linear or elongated surface features relative to the longitudinal axis of the tube can be more clearly shown by opening up and flattening out the tube so that it lies in a plane. This concept is shown in FIG. 6. There, a light transmissive tube 620 from one of the disclosed lighting systems defines a cavity 615 and extends along a longitudinal axis 616. The tube is cut or slit along a longitudinal cut line 601, and the tube, with all of its component films or other parts (ignoring any endcap that may be present) is then unrolled or unfolded to form a "flattened tube" or sheet 620'. The tube 620, which has a longitudinal dimension L and a transverse dimension W, produces a flattened tube of the same longitudinal dimension L but a larger transverse dimension W'. The dimension W' is the circumference of the original tube; hence, if the tube 620 has a circular cross-sectional shape, then W'=π×W. For purposes of this FIG. 6 and FIGS. 7A and 7B below, we assume the tube is flattened in such a way as to preserve the longitudinal axis of the original (rolled-up) tube, unless otherwise stated. The flattened tube may thus lie in or parallel to the x-z plane, with the z-axis being parallel to the longitudinal axis 616 of the original tube. Because of the way we have formed the flattened tube 620' using the longitudinal cut line 601, the left and right side edges of the flattened tube 620' are parallel to the z-axis and to the axis 616. Also, the upper major surface 622a of the flattened tube 620' is the same as the inner structured surface 622a of the tube 620, and the lower major surface 624a of the flattened tube 620' is the same as the outer structured surface 624a of the tube 620. With this background, we can use the flattened tubes of FIGS. 7A and 7B to show some examples of how the elongated surface features can be oriented relative to the longitudinal axis of the tube.

Figure 7A:
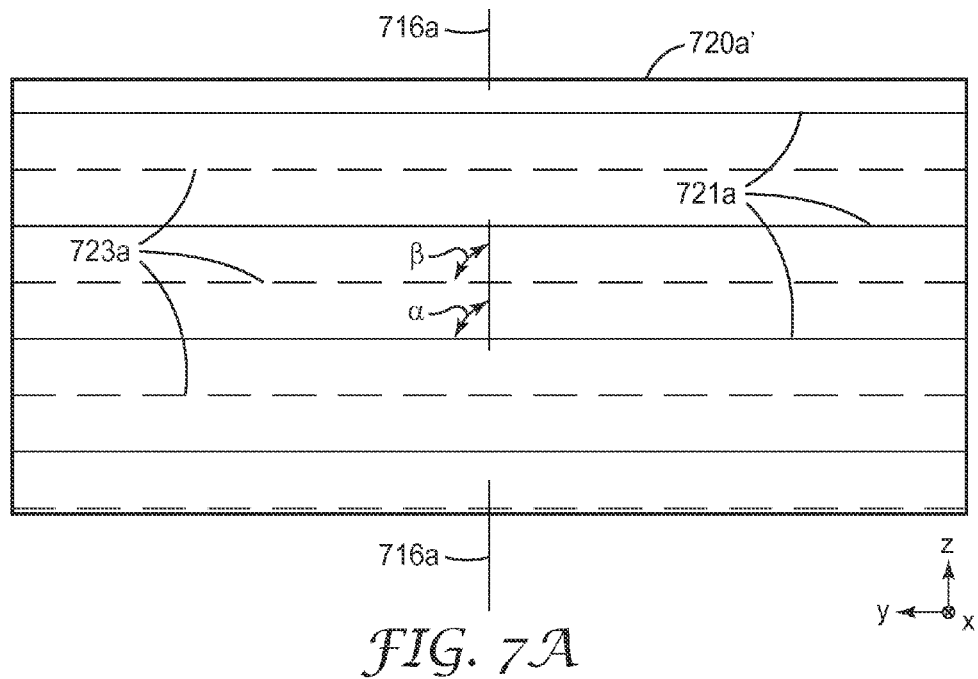
FIG. 7A is a schematic plan view of a flattened tube, where elongated features of an outer structured surface and elongated features of an inner structured surface are included in the illustration.
Figure 7B:
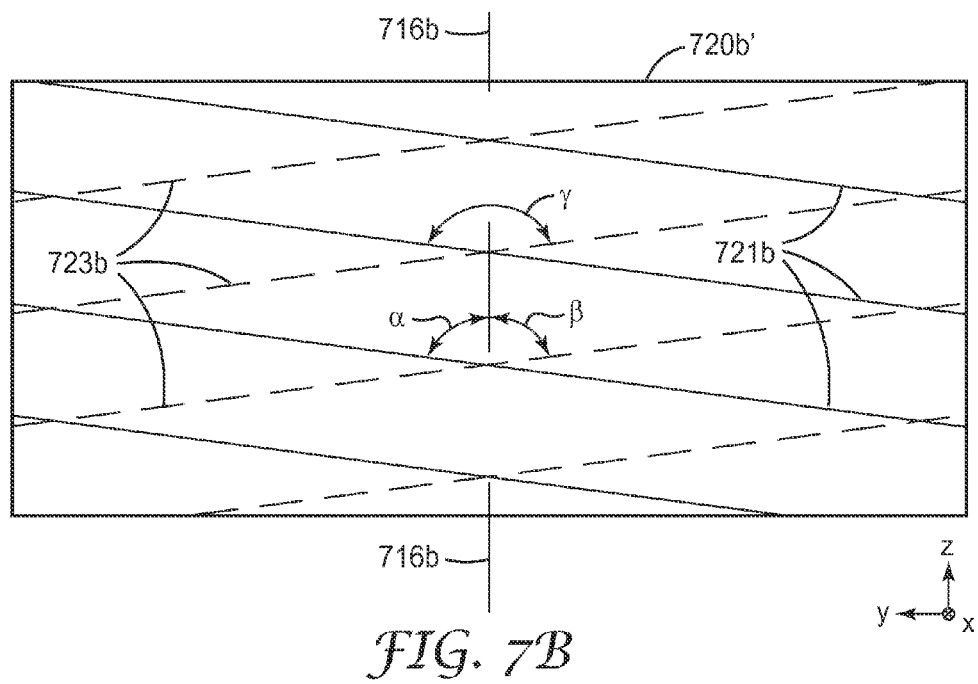
FIG. 7B is a similar schematic plan view of another flattened tube.

FIG. 7A shows an embodiment in which the elongated features of the inner and outer structured surfaces are both perpendicular to the longitudinal axis of the tube, and thus parallel to each other. The reader will understand that this means that when the flattened tube of FIG. 7A is rolled up (the reverse process of FIG. 6), folded up, or otherwise un-flattened so as to form a tube of a desired cross-sectional shape, the elongated surface features of the inner structured surface will form a first set of rings, and the elongated surface features of the outer structured surface will form a second set of rings. FIG. 7B shows an alternative embodiment in which the elongated features of the inner and outer structured surfaces are both obliquely oriented relative to the longitudinal axis of the tube, at angles that are close to but less than 90 degrees. The reader will understand that this means that when the flattened tube of FIG. 7B is rolled up, folded up, or otherwise un-flattened so as to form a tube of a desired cross-sectional shape, the elongated surface features of the inner structured surface will form a first set of helixes, and the elongated surface features of the outer structured surface will form a second set of helixes.

In FIG. 7A, a flattened tube 720a' has an upper major surface (corresponding to the inner structured surface of the associated tube) with linear or elongated features 721a, and a lower major surface (corresponding to the outer structured surface of the associated tube) with linear or elongated features 723a. The elongated features 721a make an angle α relative to the z-axis and to the longitudinal axis 716a of the tube, and α=90 degrees. The elongated features 723a make an angle β relative to the z-axis and to the longitudinal axis 716a of the tube, and β=90 degrees. The included angle, or angle of intersection (from a plan view perspective), between the features 721a and 723a is 180 degrees (or zero degrees).

In FIG. 7B, a flattened tube 720b' has an upper major surface (corresponding to the inner structured surface of the associated tube) with linear or elongated features 721b, and a lower major surface (corresponding to the outer structured surface of the associated tube) with linear or elongated features 723b. The elongated features 721b make an angle α relative to the z-axis and to the longitudinal axis 716b of the tube. As shown, α is less than 90 degrees but greater than 45 degrees. The elongated features 723b make an angle β relative to the z-axis and to the longitudinal axis 716b of the tube, and β is also less than 90 degrees but greater than 45 degrees. The included angle, or angle of intersection, between the features 721b and 723b is γ, which is shown as being less than 180 degrees but greater than about 135 degrees. In the case of symmetry about the longitudinal axis, the magnitude of α equals the magnitude of β, and the axis 716b bisects the angle γ. In asymmetrical embodiments, the magnitudes of α and β are be different, and the axis 716b does not bisect the angle γ.

In cases where the angle α between the elongated features of the inner surface and the longitudinal axis of the tube is oblique (0<α<90 degrees), the magnitude of the oblique angle can be used to control how "quickly" (as measured in terms of a longitudinal distance from the light source assembly) light is extracted from the tube, versus how far (again as measured in terms of longitudinal distance from the light source assembly) light can be made to propagate down the length of the tube. The smaller this angle is (in the limit, the elongated features of the inner structured surface are almost parallel to the longitudinal axis), the farther light propagates down the tube. Conversely, the greater this angle is (in the limit, the elongated features of the inner structured surface are almost perpendicular to the longitudinal axis), the more "quickly" light is extracted from the tube, and the shorter distance light propagates down the tube. Under a given set of conditions, such as light source type and number, tube length, and tube or cavity aspect ratio, this angular dependence of light extraction can be used to select a particular oblique angle for α that provides a desired balance of light extraction from the tube with light propagation down the tube.

Furthermore, the angle β between the elongated features of the outer structured surface and the longitudinal axis of the tube can also be used to tailor how light is extracted from the tube, and how it is reflected back towards the cavity. The angle β can also be selected, in conjunction with the angle α, and in conjunction with other sets of conditions such as light source type and tube length and aspect ratio, to provide another degree of freedom with which to tailor the spatial distribution of the output light of the lighting device. The angles α and β also have a significant impact on the visibility (e.g. presence or absence) and shape of virtual filaments, as shown further below.

FIGS. 8 through 11 are enlarged views illustrating some elongated surface features that may be used in the inner and outer structured surfaces of the light transmissive tubes. These figures should not be construed to imply that these are the only types of extended surface features that may be used in the disclosed lighting systems. For example, as noted above, although the elongated features may in some cases have an indefinite or unlimited (continuous) length, in other cases they may be interrupted and discontinuous along their length. The Cartesian coordinates that are illustrated in these figures, and in particular the orientation of those coordinates with respect to the structured surfaces, is not necessarily consistent with the orientation of the Cartesian coordinates in FIGS. 1 through 7B. This change in coordinate orientation is done only to follow the convention that when discussing an optical film or structured surface thereof, the z-axis is often oriented perpendicular to the plane of the film. Unless otherwise indicated, the structured surfaces exemplified in FIGS. 8-11, and other structured surfaces disclosed herein, may be used in any combination for the inner and outer structured surfaces of the light-transmissive tube. For example, linear lenticular surface features such as those of FIG. 9 may be used both for the inner structured surface and for the outer structured surface of a tube. Alternatively, linear prismatic surface features such as those of FIG. 8 may be used both for the inner structured surface and for the outer structured surface of a tube. Alternatively, undulating elongated surface features such as those of FIG. 11 may be used for one of the structured surfaces, and linear lenticular surface features such as those of FIG. 9 may be used for the other structured surface.

Figure 8:
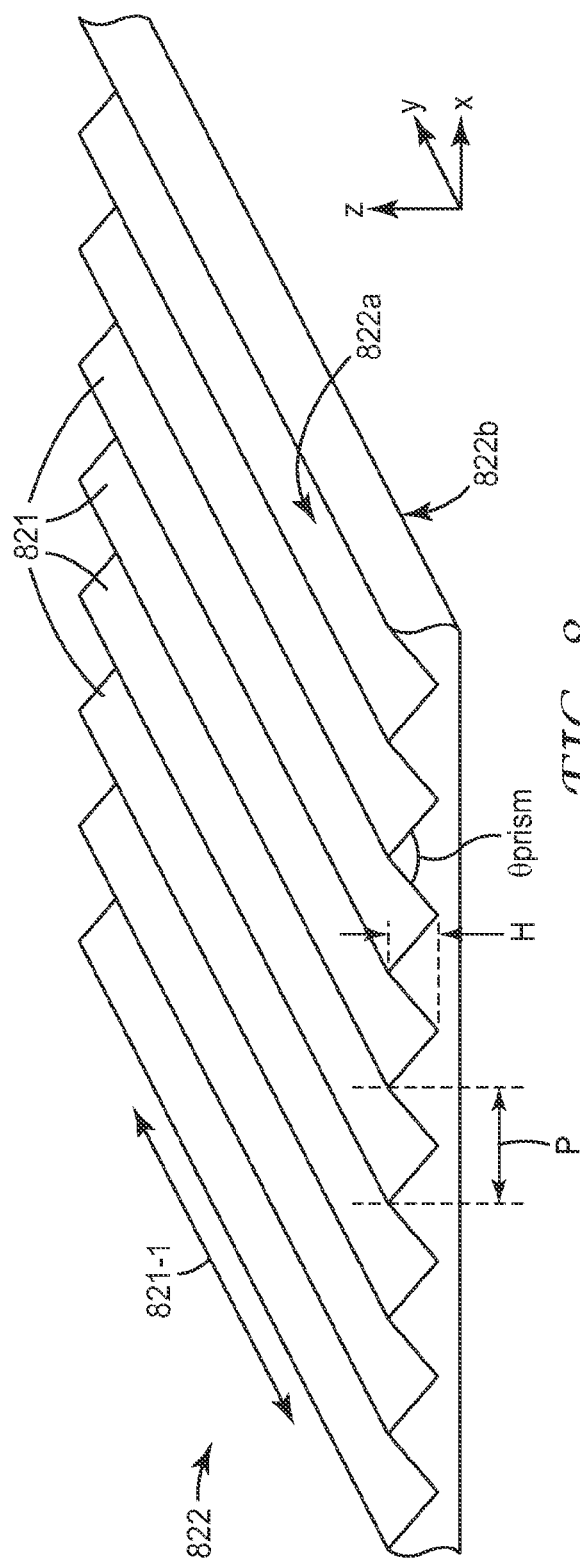
FIG. 8 is an enlarged schematic perspective view of a structured surface with elongated prismatic features, which have prismatic cross-sectional shapes.

In FIG. 8, a film 822 has a structured major surface 822a opposite a flat or smooth major surface 822b. This film can be used in the construction of a light-transmissive tube such that the structured surface 822a is used as an inner structured surface and/or an outer structured surface of the tube. The structured surface 822a has an array of distinct elongated prismatic features 821. The features 821 each extend parallel to a feature axis 821-1, which in this case is parallel to the y-axis. Each feature 821 may have substantially flat or planar side surfaces that meet along a sharp peak or ridge of the feature. In a cross-sectional plane perpendicular to the feature axis 821-1, the features 821 exhibit a prismatic shape, characterized by a prism angle θprism, a height H, and a pitch (feature-to-feature distance) P. Variations on this basic geometry are also contemplated. For example, the peak or ridge of the features may be somewhat rounded, the height H may not be uniform—both with respect to feature-to-feature height (some prismatic features may have a different (greater or lesser) height H than others), and with respect to a single feature (the height H of a given prismatic feature may change along the length of the feature)—and the pitch P may not be uniform—both with respect to feature-to-feature pitch (the pitch of one group of prismatic features on the structured surface 822a may be different (greater or lesser) than the pitch of another group of prismatic features), and with respect to a single feature (the pitch P of a given prismatic feature relative to its neighboring features may change along the length of the feature, e.g. as a result of a change in the transverse dimension (width) of the feature along its length). Prismatic structured surface films that may provide a suitable prismatic structured surface in the disclosed lighting devices include any of the 3M™ Vikuiti™ Brightness Enhancement Films (BEF), and any of the 3M™ Vikuiti™ Transmissive Right Angle Films (TRAF) that are or have been offered for sale by 3M Company, St. Paul, Minn.

Figure 9:
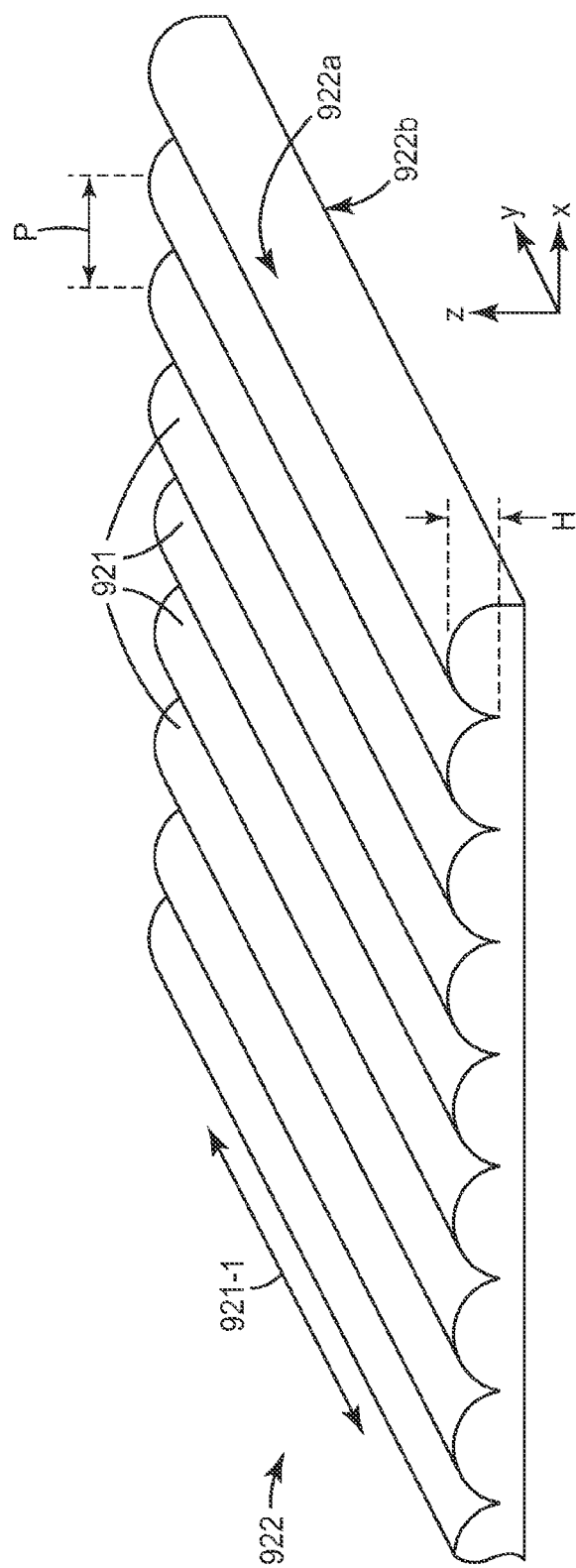
FIG. 9 is an enlarged schematic perspective view of a structured surface with elongated lenticular features, which have lenticular cross-sectional shapes.

In FIG. 9, a film 922 has a structured major surface 922a opposite a flat or smooth major surface 922b. This film can be used in the construction of a light-transmissive tube such that the structured surface 922a is used as an inner structured surface and/or an outer structured surface of the tube. The structured surface 922a has an array of distinct elongated lenticular features 921. The features 921 each extend parallel to a feature axis 921-1, which is parallel to the y-axis. Each feature 921 has a curved lens-like (lenticular) surface that is flat or rounded at the top of the feature. In a cross-sectional plane perpendicular to the feature axis 921-1, the features 921 exhibit a lenticular shape. This shape may have a constant curvature, as in the case of an arc of a circle, or it may have a variable curvature, e.g., less curvature at the top than at the base, or more curvature at the top than at the base. A variable curvature shape of particular interest is one defined by a Bezier function, as discussed further below. In addition to the precise nature of the surface curvature, the features 921 on the surface 922a may also be characterized by a height H and a pitch (feature-to-feature distance) P. The height H and/or pitch P may be uniform over the entire structured surface 922a, or either or both of them may change from feature-to-feature, or along a given feature, as discussed above in connection with FIG. 8. An example of a lenticular structured surface film that may provide a suitable lenticular structured surface in the disclosed lighting devices is 3M™ Uniformity Tape sold by 3M Company, St. Paul, Minn.

Figure 10:
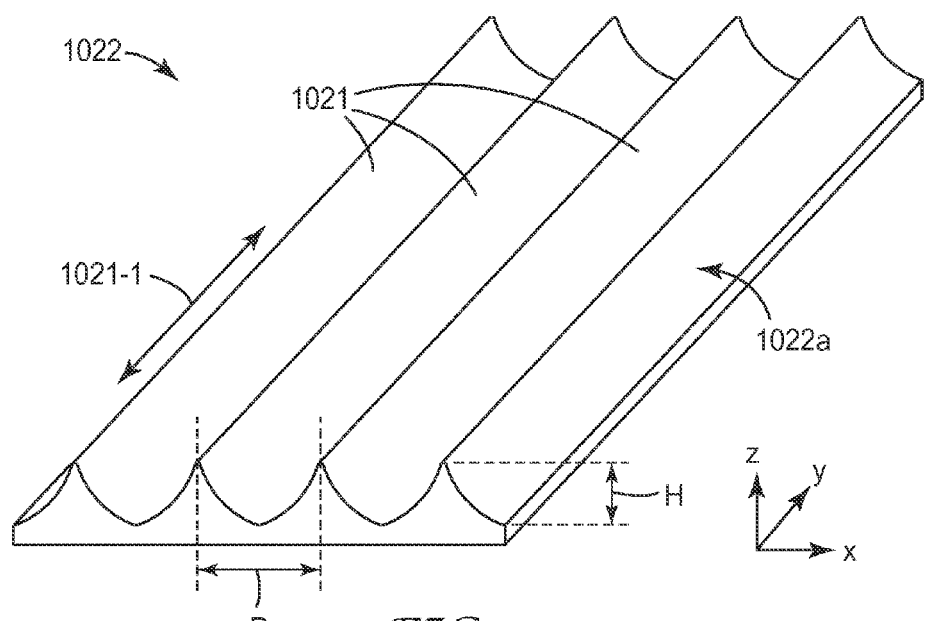
FIG. 10 is an enlarged schematic perspective view of a structured surface with other elongated features that have curved side surfaces.

FIG. 10 shows an example of another structured surface whose elongated features have curved surfaces in transverse cross-section. In FIG. 10, a film 1022 has a structured major surface 1022a opposite a flat or smooth major surface 1022b. This film can be used in the construction of a light-transmissive tube such that the structured surface 1022a is used as an inner structured surface and/or an outer structured surface of the tube. The structured surface 1022a has an array of distinct extended features 1021. The features 1021 each extend parallel to a feature axis 1021-1, which is parallel to the y-axis. Each feature 1021 has curved side surfaces that meet at a highly curved (small radius of curvature) peak or ridge of the feature. In a cross-sectional plane perpendicular to the feature axis 1021-1, the features 1021 have a concave curvature at the sides and a highly curved convex shape at the peak. This variable curvature may be defined by a Bezier function, as discussed further below. In addition to the precise nature of the surface curvature, the features 1021 on the surface 1022a may also be characterized by a height H and a pitch (feature-to-feature distance) P. The height H and/or pitch P may be uniform over the entire structured surface 1022a, or either or both of them may change from feature-to-feature, or along a given feature, as discussed above in connection with FIGS. 8 and 9.

Figure 11:
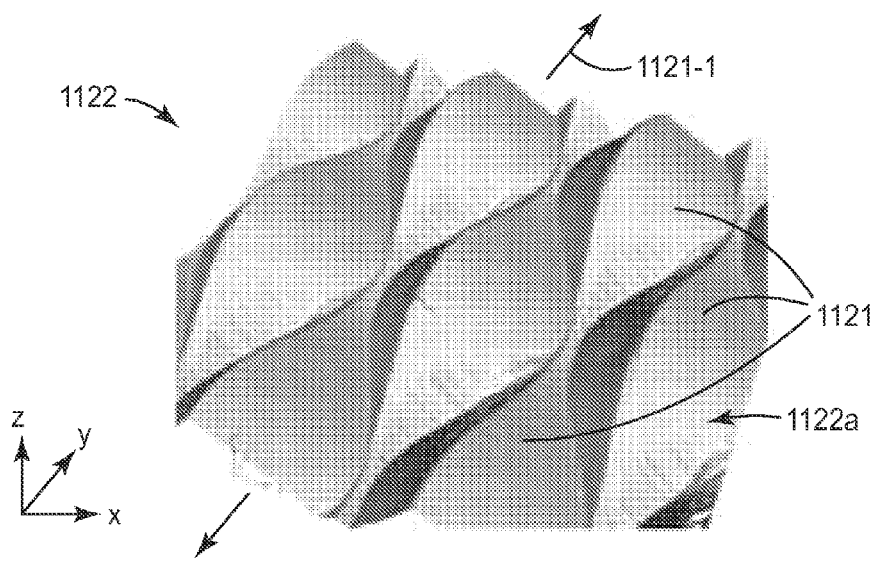
FIG. 11 is an enlarged schematic perspective view of a structured surface with elongated features that undulate in height and width along their length.

FIG. 11 shows an example of still another structured surface whose elongated features have curved surfaces. In FIG. 11, a film 1122 has a structured major surface 1122a opposite a flat or smooth major surface (not labeled). This film can be used in the construction of a light-transmissive tube such that the structured surface 1122a is used as an inner structured surface and/or an outer structured surface of the tube. The structured surface 1122a has an array of distinct elongated features 1121. The features 1121 each extend parallel to a feature axis 1121-1, which is parallel to the y-axis. The features 1121 undulate in both height and width along their length. In a cross-sectional plane perpendicular to the feature axis 1121-1, the features 1121 may have a V- or inverted V-shape, the sides of which may be straight or curved. Additionally, due to the undulating characteristic of the features, the side surfaces of the features 1121 are curved in the plane of the film, i.e., in cross-sectional planes parallel to the x-y plane of FIG. 11. The curvature in such planes can be tailored by appropriate selection of the repeat distance (physical wavelength) of the longitudinal undulation, with a shorter repeat distance producing greater curvature in the x-y plane. Structured surfaces similar to that of FIG. 11 are disclosed in U.S. Pat. No. 7,695,180 (Schardt et al.), the entire disclosure of which is incorporated herein by reference.

Structured surfaces whose elongated features have a surface or surfaces that are substantially curved can influence the degree of spatial uniformity (or non-uniformity) of the output light, and thus can also influence the visibility of virtual filaments as described herein. This is because the curved surface(s) can redirect incident light (e.g. by refraction or reflection) over a broader range of output angles than a flat surface.

Curved surfaces of particular interest are those that can be characterized by a Bezier function, and in particular, a cubic Bezier function. Surfaces characterized by such functions are disclosed in Patent Application Publication US 2013/0258709 (Thompson et al.), the entire disclosure of which is incorporated herein by reference. Briefly summarized, a shape function such as the height profile of the cross-sectional shape of a prism, lens, or other feature, or more precisely the portion of that height profile from a point at or near the base to a point at or near the top or peak of the feature, can be converted by a scaling factor and simple translation to a scaled function that lies in a given plane (referred to here as an X,Y plane), the scaled function having a first endpoint $(X_0, Y_0)$, e.g. associated with the top or peak, and a second endpoint $(X_3, Y_3)$, e.g. associated with the base, and where the scaling and translation operations provide that $X_0=0$, $X_3=1$, and $Y_3=0$, then the height profile is characterized by a (cubic) Bezier function if the scaled, translated function satisfies the following set of parametric equations:

$$X(t)=a_x t^3+b_x t^2+c_x t+X_0$$

$$Y(t)=a_y t^3+b_y t^2+c_y t+Y_0$$

where t ranges from 0 to 1, and where (X(0), Y(0)) is the first endpoint $(X_0, Y_0)$, and where (X(1), Y(1)) is the second endpoint $(X_3, Y_3)$, and where $(X_1, Y_1)$ and $(X_2, Y_2)$ are "control points" that lie somewhere in the X,Y plane, and further where:

$$c_x=3(X_1-X_0),$$

$$b_x=3(X_2-X_1)-c_x,$$

$$a_x=X_3-X_0-c_x-b_x,$$

$$c_y=3(Y_1-Y_0),$$

$$b_y=3(Y_2-Y_1)-c_y, \text{ and}$$

$$a_y=Y_3-Y_0-c_y-b_y.$$

Furthermore, we can require the control point coordinate $Y_1$ to equal $Y_0$, in which case: $Y_0$ and $Y_1$ may be in a range from 0.75 to 2.25 (or in some cases from 0.75 to 1.25); $X_1$ may be in a range from 0.1 to 0.6; $X_2$ may be in a range from 0.1 to 0.6; and $Y_2$ may be in a range from 0.5 to 1.0.

The inner and outer structured surfaces of the lighting device may be embodied in one or more optical films or other components of the lighting device, including but not limited to optical bodies such as those shown schematically in FIGS. 8-11, and may be formed using any suitable technique. For example, a structured layer may be cast onto a carrier film or other substrate using a patterned drum or tool, and then cured. Alternatively, the structures and substrate may be made of a single material or layer in an extrusion replication process, e.g. as described in international application WO 2010/117569 (Bay et al.).

In one approach, two structured surfaces may be formed on opposed sides of a single carrier film or other substrate by a cast-and-cure process, e.g. using UV-curable formulations of selected refractive indices on both sides of the substrate, such that the surface features on the opposed sides of the substrate have the same or different shape, and such that they have the same or different refractive indices. In another approach, a two-sided replicated film (e.g., an optical film whose opposed major surfaces are structured surfaces containing elongated surface features as described herein) may be made using a single thermoplastic or curing material using extrusion replication against two structured rolls, or using compression molding or embossing, or by casting and curing between two structured tools or liner, e.g., a PDMS elastomer made via hydrosilylation reaction, Sylgard 184 from Dow Corning or elastomeric polyurethanes, or the like. In another approach, the two structured surfaces can be formed on separate carrier films or substrates, e.g. via a cast-and-cure process to make two distinct structured films each of which has only one structured surface. Such films may then be used in the following ways: they may be laminated together with a suitable adhesive (e.g., pressure sensitive or structural) to form a single film construction having two structured surfaces; the films may remain separate and unbounded (not attached to each other), and inserted into a tubular sleeve such that both of the structured films (an inner one with its structured surface facing inward, and an outer one with its structured surface facing outward) are pressed or held against the inner surface of the sleeve; or one structured film can be inserted and optionally attached to the inside of a tubular sleeve, with its structured surface facing inward, and the other structured film can be laminated to the outer surface of the sleeve, with its structured surface facing outward. In another approach, whether the two structured surfaces are formed on opposite sides of a single substrate or formed on separate substrates, the structured film or films can itself or themselves be wound or folded up to form a self-supporting tube. In winding or folding the film(s), the opposite edges of the film(s) may be attached to each other with no longitudinal translation (e.g. the reverse process of the unfolding depicted in FIG. 4), or a longitudinal translation may be used so that the film(s) itself/themselves curl in a spiral fashion. Some of these approaches are discussed further elsewhere herein.

The materials used in the structured optical films and bodies may be any suitable light-transmissive polymers or other materials. For films made by casting a curable resin onto a substrate, the substrates can comprise materials such as polyester, polycarbonate styrene-acrylonitrile, cellulose acetate butyrate, cellulose acetate propionate, cellulose triacetate, polyether sulfone, polymethyl methacrylate, polyurethane, polyvinyl chloride, polystyrene, polyethylene naphthalate, copolymers or blends based on naphthalene dicarboxylic acids, polycyclo-olefins, and polyimides. Optionally, the substrate material can contain mixtures or combinations of these materials In some embodiments, the substrate may be multi-layered or may contain a dispersed component suspended or dispersed in a continuous phase. Any suitable material or materials can be used to form the structured optical film. For example, the structures can be formed from organic or inorganic high index resins. In some embodiments, the structures can be formed from high index resins that include nanoparticles, such as the resins described in U.S. Pat. No. 7,547,476 (Jones et al.). In other embodiments, the structures can be formed from UV curable acrylic resins, e.g., those described in Patent Application Publication US 2009/0017256 A1 (Hunt et al.), and International Patent Publication WO 2010/074862 (Jones et al.).

Useful materials that may be used to form the structured optical films by either extrusion replication or an embossing process include, for example, thermoplastic materials such as styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, and polycyclo-olefins. Optionally, the material used to form the structures may include mixtures or combinations of these materials. In some embodiments, particularly useful materials include polymethyl methacrylate, polycarbonate, styrene methacrylate and cycloolefin polymers (for example Zeonor and Zeonex available from ZEON Chemicals).

The structured optical films may also be formed from other suitable curing materials such as epoxies, polyurethanes, polydimethylsiloxanes, poly(phenyl methyl)siloxanes, and other silicone based materials, for example, silicone polyoxamides and silicone polyureas. The structured surface layer can also include a short wavelength absorber (e.g., UV light absorber).

In many cases, a given structured surface is exposed to air to provide a maximum difference in refractive index across the boundary of the structured surface, and thus a maximum refractive power at that surface. In other cases, however, the given structured surface may be embedded or buried between two solid layers, e.g., as in the case of a polymer film whose structured surface is planarized (e.g. completely covered over) by another material of different refractive index. The planarizing material or layer may for example be a polymer of a higher or lower refractive index than the base polymer layer. Ultra low index (ULI) materials, which may have a refractive index for visible light in a range from 1.1 to 1.3, or from 1.15 to 1.25, as described in patent application publication US 2012/0206806 (Weber), may be suitable for such purposes. Examples of embodiments in which at least one structured surface is embedded or buried include, for example, a shallow structured surface of lenticular features embedded beneath a layer that has another structured surface. The another structured surface may have suitable surface features, such as prismatic features, which may be exposed to air, or embedded by yet another optical layer. Whether buried or exposed to the air, the inward-facing and outward-facing structured surfaces referred to herein are typically refractive in nature, i.e., the surface features of such structured surfaces are sufficiently large to operate on principles of refraction. However, any of the optical films Of surfaces of the disclosed lighting devices may also include one or more additional structured surface, whether buried or exposed to air, including structured surface(s) that are diffractive in nature, e.g. to add color to the device for functionality and/or for aesthetic purposes. Carrier films for any of the disclosed structured surface layers or films may be or comprise any suitable optical film, including a simple monolayer of a light-transmissive polymer material, or films that comprise multiple layers, including multilayer optical films that reflect and transmit light as a result of constructive or destructive interference from interfaces between individual microlayers of the film. Suitable multilayer optical films may include reflective polarizer films, color-shifting mirror films, and/or color-shifting polarizer films. Reference in this regard is made to U.S. Pat. No. 5,882,774 (Jonza et al.) and U.S. Pat. No. 6,531,230 (Weber et al.).

In some cases, where two individual optical films are combined into a single film construction, adhesives can be used to bond the individual films together. In other cases the individual films may be laminated or affixed to a tubular support structure. For example, the structured surface layer can be attached to the inner and/or outer surface of the tubular support structure with an adhesive layer. In some embodiments, the adhesive layer is optically clear and colorless to provide optical coupling between the two structured surface layers and/or to the tubular support. Further, the adhesive layer may preferably be non-yellowing and resistant to heat and humidity, thermal shock, etc.

The adhesive layer can be formed using any suitable material or materials. In some embodiments, the adhesive layer may include any suitable repositionable adhesive or pressure-sensitive adhesive (PSA). Useful PSAs include those that meet the Dalquist criterion (as described in Handbook of Pressure Sensitive Adhesive Technology, Second Ed., D. Satas, ed., Van Nostrand Reinhold, N.Y., 1989). The PSA can comprise various chemical compositions, many of which are described in Patent Application Publication US 2013/0258709A1 (Thompson et al.).

In some embodiments, the PSA includes an optically clear PSA having high light transmittance of from about 80 to about 100%, from about 90 to about 100%, from about 95 to about 100%, or from about 98 to about 100% over at least a portion of the visible light spectrum (about 400 to about 700 nm). In some embodiments, the PSA has a haze value of less than about 5%, less than about 3%, or less than about 1%. In some embodiments, the PSA has a haze value of from about 0.01 to less than about 5%, from about 0.01 to less than about 3%, or from about 0.01 to less than about 1%. Haze values in transmission can be determined using a haze meter according ASTM D1003.

In some embodiments, the PSA is or includes an optically clear adhesive having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%. or from about 0.01 to less than about 1%.

In some embodiments, the PSA is hazy and diffuses light, particularly visible light. A hazy PSA may have a haze value of greater than about 5%, greater than about 20%, or greater than about 50%. A hazy PSA may have a haze value of from about 5 to about 90%, from about 5 to about 50%, or from about 20 to about 50%. The haze that diffuses the light may in some embodiments be primarily forward scattering, meaning that little light is scattered back toward the originating light source when the light is incident at an oblique angle.

The refractive indices of the structured surface films, adhesives, and other light-transmissive components in the lighting device may be selected based on the overall lighting system construction. The structured films and PSAs may have refractive indices in the range of from about 1.3 to about 2.6, or from about 1.4 to about 1.7, or from about 1.45 to about 1.7.

As discussed above, the disclosed lighting devices may include a light source assembly which injects light into the cavity formed by the light-transmissive tube. To accomplish this, the light source assembly comprises one or more individual light sources, typically solid state light sources such as LEDs. The LED(s) may emit white light or narrower band light such as red, green, or blue visible light, or light of another emission spectrum suitable for the intended application. Another characteristic of the light sources, which may have a significant impact on the uniformity and brightness of the light emitted from the tube, is the output distribution of the LED as expressed for example in terms of the angular width or degree of collimation of the output light. Some LEDs produce highly collimated output light, whereas other LEDs produce uncollimated, or even side-emitting output distributions. FIGS. 12A through 14B provide some schematic illustrations of some such representative light sources.

Figure 12A:
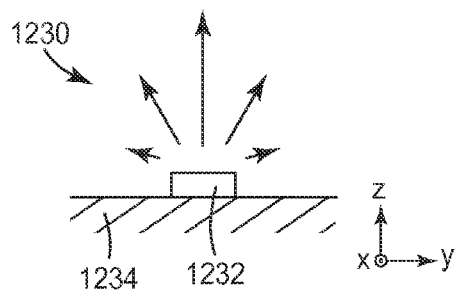
FIGS. 12A, 13A, and 14A are a schematic side or sectional views of various solid state LED light sources.
Figure 12B:
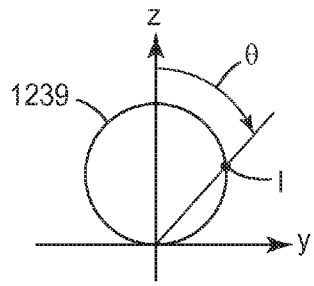
FIGS. 12B, 13B, and 14B are schematic depictions of their respective output distributions as a function of polar angle.

In FIG. 12A, an LED light source 1230 comprises an LED die 1232 attached to a base 1234. The source is shown in relation to a Cartesian x-y-z axis that may be the same as that of FIG. 1, where the z-axis is parallel to the longitudinal axis of the tube. The z-axis is also assumed for purposes of FIGS. 12A-14B to be parallel to an output axis or symmetry axis of the light source. In FIG. 12A, no encapsulant or other structure is provided to change the degree of collimation of the output light, or if an encapsulant (not shown in FIG. 12A) is provided, it may have a flat output surface parallel to the x-y plane. In either case the output light from the source 1230 may be Lambertian or substantially Lambertian. This is shown in FIG. 12B by the curve 1239 of light intensity versus polar angle θ for the source 1230, the polar angle being measured relative to the z-axis. One way of characterizing the degree of collimation is to measure the polar angle θ at which the intensity-versus-angle function drops to half of its maximum value.

Figure 13A:
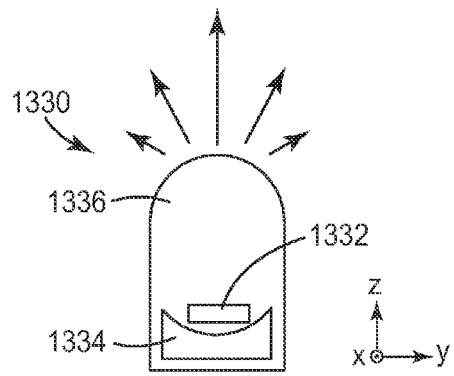
Figure 13B:
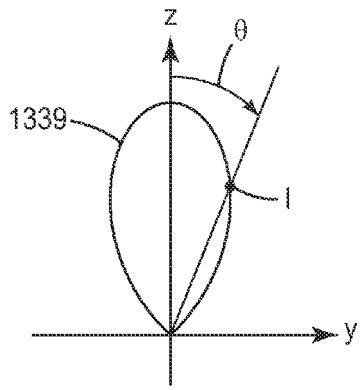

In FIG. 13A, another LED light source 1330 is shown. In the light source 1330, the LED die 1332 is mounted on a base 1334 that includes a concave reflector and a convex encapsulant 1336. These elements help to collimate the output light of the source 1330 relative to that of the light source 1230. The more collimated output is represented in FIG. 13B by the curve 1339 of light intensity versus polar angle θ for the source 1330. The angular width of this light output, as measured by the polar angle θ at which the intensity-versus-angle function drops to half maximum, is smaller than that of the source of FIG. 12A.

Figure 14A:
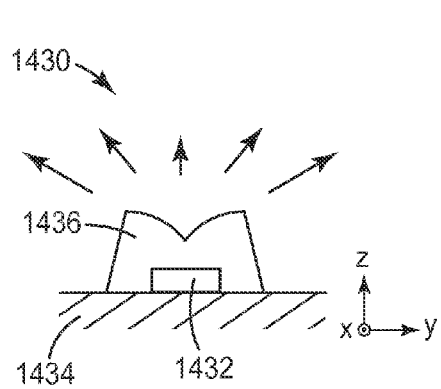
Figure 14B:
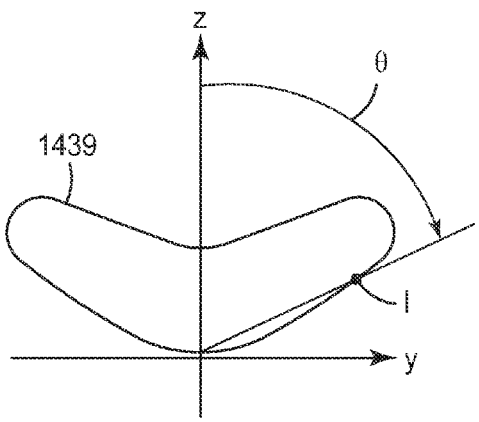

In FIG. 14A, another LED light source 1430 is shown. In the light source 1430, the LED die 1432 is mounted on a base 1434 and is immersed in an encapsulant 1436 that is shaped to preferentially direct light from the die 1432 along directions that are divergent from the symmetry axis of the component. The encapsulant 1436 thus de-collimates the output light of the source 1430 relative to that of the light source 1230, to produce a preferentially side-emitting LED. The less collimated output is represented in FIG. 14B by the curve 1439 of light intensity versus polar angle θ for the source 1430. The angular width of this light output, as measured by the polar angle θ at which the intensity-versus-angle function drops to half maximum (and where we require that this polar angle is greater than the polar angle of maximum intensity), is greater than that of the sources of FIGS. 12A and 13A.

Figure 15:
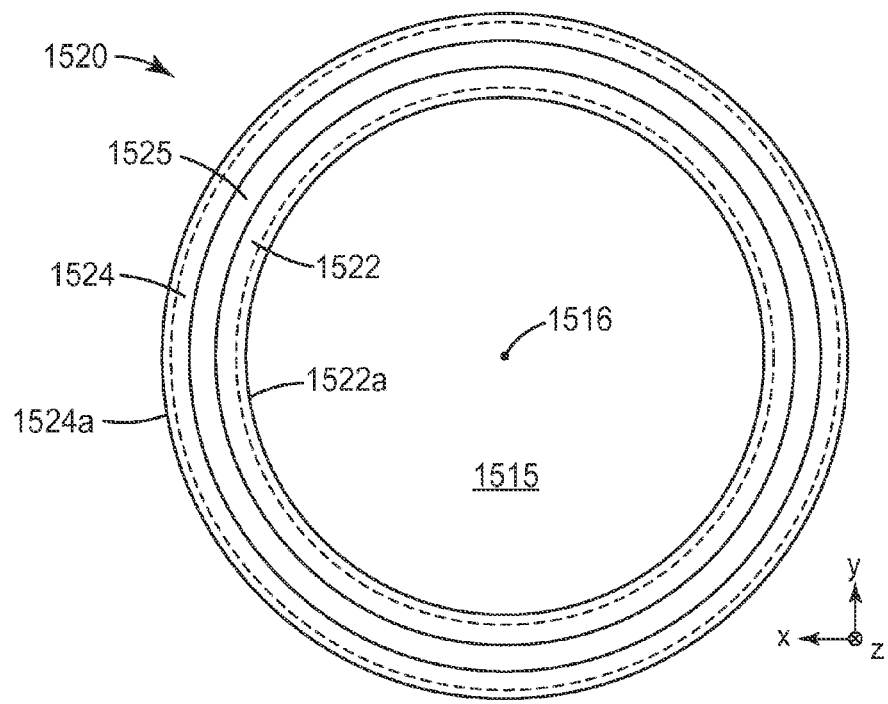
FIGS. 15 and 16 are schematic cross-sectional or end views of different tubes suitable for use in the disclosed lighting devices.
Figure 16:
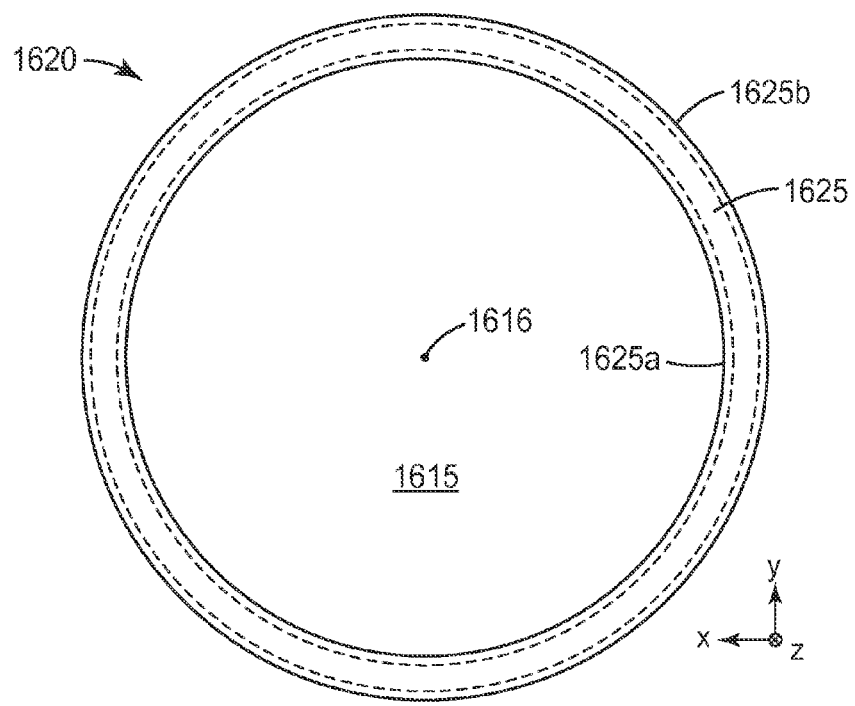

Another component of the disclosed lighting devices and systems is the light-transmissive tube. The tube may be made in a variety of different shapes and sizes, and may have a variety of different component parts and construction configurations. Some of these configurations are shown in FIG. 15 and following. The schematic views of FIGS. 15 and 16 are down the longitudinal axis of the respective tubes.

In FIG. 15, a light-transmissive tube 1520 suitable for use in the disclosed lighting devices includes a sleeve member 1525 inside of which a structured optical film 1522 is disposed, and outside of which a structured optical film 1524 is disposed. The film 1522 has a structured surface 1522a, and the film 1524 has a structured surface 1524a. The optical films 1522, 1524 may be attached to the sleeve 1525 by an optically clear adhesive or another suitable mechanism, or the inner optical film 1522 may be held loosely or only by friction within the sleeve 1525. Each of the films 1522, 1524 is shown to be carefully sized such that they completely surround the inner and outer circumference (respectively) of the sleeve 1525 without overlapping themselves. In alternative embodiments one or both such films may be oversized in the sense that their transverse dimension may be greater than the circumference of the sleeve 1525, such that one end of these films overlaps with its opposite end. In still other embodiments one or both such films may be undersized such that they surround or occupy only a portion of the tube circumference, such as shown below in FIGS. 24B and 26B. Note in this regard that the tube "circumference" should be broadly interpreted to encompass not only tubes with circular cross-sectional shapes but also those with non-circular, including e.g. polygonal, cross-sectional shapes. In still other embodiments both of the structured optical films may be attached or otherwise held on the inside of the sleeve 1525, or both may be attached on the outside of the sleeve. In still other embodiments, the sleeve 1525 may be omitted and the films 1522, 1524 may be attached to themselves or to another reinforcing member to provide the light-transmissive tube.

However, referring again to FIG. 15, the tube 1520 includes the sleeve 1525 as well as the structured optical films 1522, 1524. The tube 1520 defines a cavity 1515 and a longitudinal axis 1516. The structured surface 1522a of film 1522 provides an inner structured surface that faces the cavity 1515. The structured surface 1524a of film 1524 provides an outer structured surface that faces away from the cavity 1515. The inner structured surface 1522a is configured to direct a first portion of light injected into the cavity 1515 by the light source assembly (not shown) towards the outer structured surface 1524a, and to direct a second portion of the injected light back into the cavity 1515. The inner structured surface 1522a has elongated first features and the outer structured surface 1524a has elongated second features, and these elongated first and second features are oriented to provide the appearance of one or more virtual filaments in the output area of the lighting device.

The various components of the disclosed tubes are sufficiently light transmissive so that the inner and outer structured surfaces can cooperate to redirect light from the light source assembly outward from the emitting area of tube, keeping in mind that the emitting area may be the entire outer surface of the tube, or only a portion thereof. Thus, in some cases, some or all of the components of the tube 1520 may be made of substantially water-clear, low haze materials, such that little or no light diffusion or scattering occurs other than that associated with the structured surfaces of the structured optical films. In other cases, one, some, or all of the components of the tube may exhibit a controlled amount of light scattering, absorption, and/or reflection. Such optical characteristics may be introduced for utilitarian purposes, e.g. to enhance the spatial uniformity of the output light, or for aesthetic purposes, e.g. to provide a desired color or appearance to the output light. Some optical characteristics may provide both utilitarian and aesthetic benefits, such as in the case where the tube includes a reflective polarizing film. Such a film, whether used as a sleeve such as sleeve 1525 or as a carrier film or other component of one of the structured surface films, may both cause the light output to be polarized, which may serve utilitarian purposes in some applications, and give the lighting device a shiny metallic appearance when the device is turned off, for aesthetics. For example, scattering particles or other scattering agents may also be incorporated into one or more of the optical films, adhesives, or other components of the tube or lighting device.

FIG. 16 shows another construction configuration of a light-transmissive tube. There, tube 1620 may be or include a single sleeve member 1625 whose inner surface 1625a and outer surface 1625b are both structured to include any of the elongated features described above. The tube 1620 defines a cavity 1615 and a longitudinal axis 1616. The inner structured surface 1625a faces the cavity 1615 and cooperates with the outer structured surface, which faces away from the cavity 1615, to redirect light from the light source assembly (not shown) outward from the emitting area of tube 1620. The inner structured surface 1625*a* has elongated first features and the outer structured surface 1625*b* has elongated second features, and these elongated first and second features are oriented to provide the appearance of one or more virtual filaments in the output area of the lighting device. The tube 1620 may be made by winding a single film having opposed structured surfaces, or a laminated pair of structured surface films, in on itself (e.g. the reverse process of the unfolding depicted in FIG. 6), and attaching the film edges along a seam (not shown). Other characteristics and features of the tube 1620, and of other light-transmissive tubes disclosed herein, including but not limited to the incorporation of scattering, absorption, and/or reflective agents or structures, can be incorporated into the tube 1620 or other aspects of the lighting device as appropriate.

Figure 17:
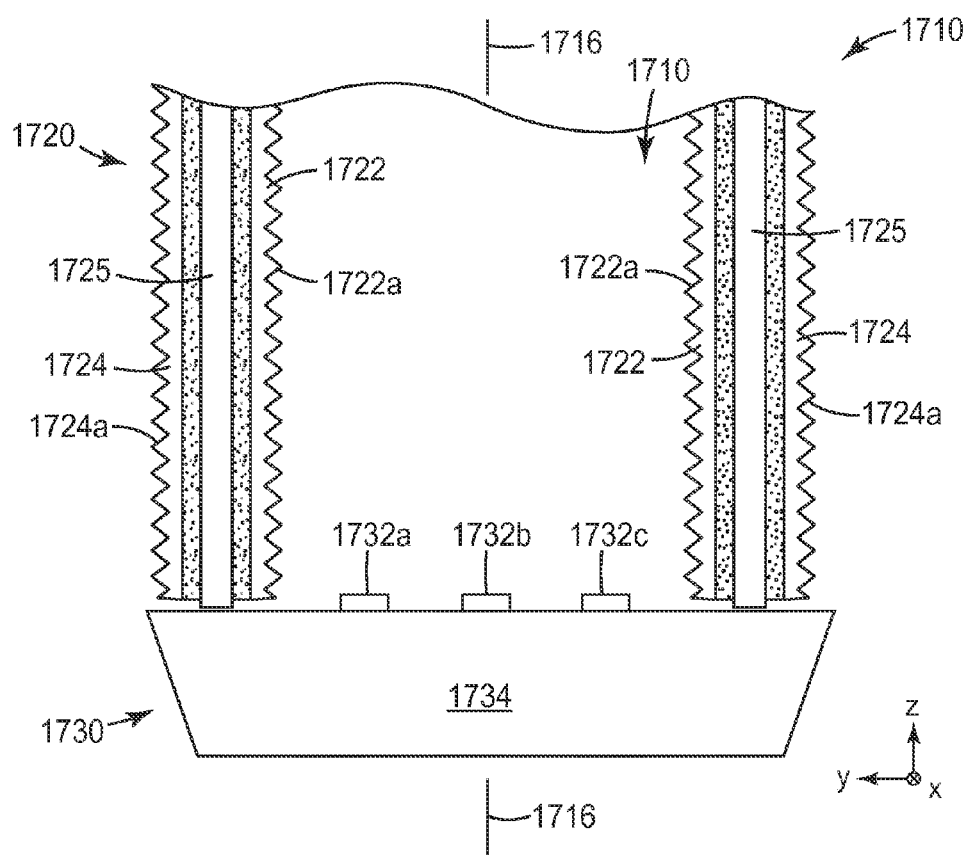
FIG. 17 is a schematic cross-sectional view of a lighting device through a plane that is parallel to the longitudinal axis of the tube.

FIG. 17 shows a schematic cross-sectional view of a lighting device 1710 through a plane that is parallel to the longitudinal axis 1716 of the tube 1720. The device 1710 may be the same as or similar to other lighting devices discussed herein. The device 1710 includes a light-transmissive tube 1720 that defines a cavity 1715 and the longitudinal axis 1716. The tube 1720 attaches to or otherwise couples to a light source assembly 1730. The assembly 1730 includes discrete light sources 1732*a*, 1732*b*, 1732*c* mounted on a header or base 1734. The light sources inject light into the cavity 1715, and they may be any of the light source types discussed herein. The tube 1720 has a construction similar to that shown in FIGS. 1A and 15, namely, it comprises a transparent sleeve 1725 to which an inner structured optical film 1722 and an outer structured optical film 1724 are attached by an optically clear adhesive or other suitable bonding material. The inner film 1722 has an inward-facing structured surface 1722*a*, and the outer film 1724 has an outward-facing structured surface 1724*a*. The inner and outer structured surfaces incorporate linear or otherwise elongated surface features which are oriented relative to the longitudinal axis 1716 such that they provide the virtual filaments along the tube 1720 and which may appear to reside in the tube, or at least behind the outer structured surface 1724*a* of the tube.

The positions and shapes of the virtual filaments in the emitting area of the light-transmissive tube, and the manner in which the shapes change as a function of changing viewing geometry, are dependent on the positions of their respective discrete light sources inside the tube. In the embodiment of FIG. 17, the light source 1732*b* is disposed at or near the longitudinal axis 1716 of the tube 1720, and/or at or near the center or axis of curvature (which may coincide with the longitudinal axis 1716) of at least a portion of the tube 1720, whereas the light sources 1732*a*, 1732*c* are spaced apart from such an axis or axes. Due to its position in the tube, the light source 1732*b* produces a virtual filament whose shape is straight, and the shape remains straight over a range of azimuthal observation angles. In comparison, the light sources 1732*a*, 1732*c* produce virtual filaments whose shapes change with changing observation angle. The shape of each such filament may change from being curved in one direction, to straight, to curved in an opposite direction.

Figure 18:
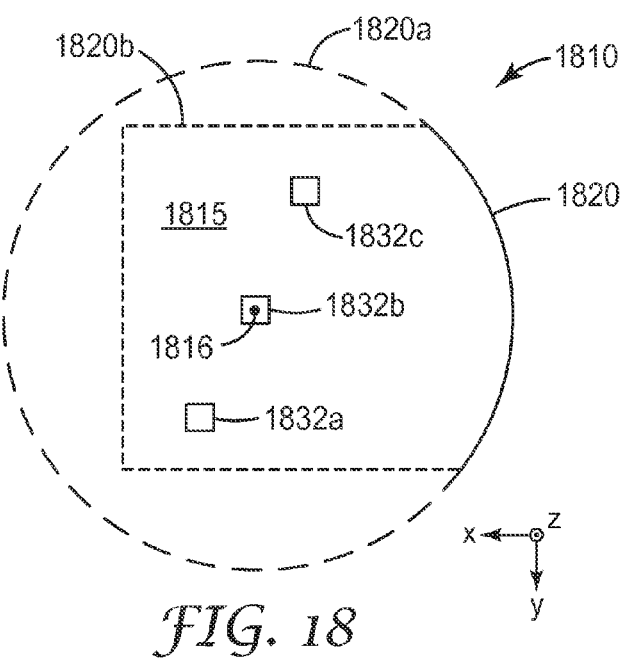
FIG. 18 is a schematic plan view of a lighting device showing a curved portion of a light-transmissive tube and a plurality of discrete solid state sources disposed to inject light into the tube.

A plan view of an exemplary arrangement of individual light sources relative to a curved portion of a light-transmissive tube is shown in FIG. 18. There, a lighting device 1810 includes a light transmissive tube that defines a cavity 1815 and a longitudinal axis 1816 parallel to the z-axis. A curved portion 1820 of the tube is shown as a solid line. The remainder of the tube may be any desired shape, two possibilities of which are shown in dashed lines. In the optional tube portion 1820*a*, the shape remains curved in the same way as portion 1820, thus forming a complete circle. In the optional tube portion 1820*b*, the shape changes to polygonal. In either case, the longitudinal axis 1816 is also the center of curvature (or axis of curvature) of the tube portion 1820 and the optional tube portion 1820*a*. The light-transmissive tube includes one or more optical films that provide suitable inward-facing and outward-facing structured surfaces with suitably oriented linear or otherwise elongated surface features as described above.

A light source assembly includes discrete light sources 1832*a*, 1832*b*, 1832*c* which inject light into the cavity 1815. The light source 1832*b*, which may be an LED, is disposed at or near the axis 1816. The other light sources 1832*a*, 1832*c* may also be LEDs, but are disposed at positions spaced apart from the axis 1816, for example, typically by several millimeters or tens of millimeters, e.g., at least 5 mm, or at least 10 mm, or at least 15 mm, or at least 20 mm. A user who directly observes the emitting area of the lighting device 1810 at the curved portion 1820 sees in the tube three virtual filaments corresponding to the three light sources. Due to its position at the center of curvature, the light source 1832*b* produces a virtual filament whose shape is straight, and remains straight over a range of azimuthal observation angles. The light sources 1832*a*, 1832*c* produce virtual filaments whose shapes change with changing observation angle.

Figure 19:
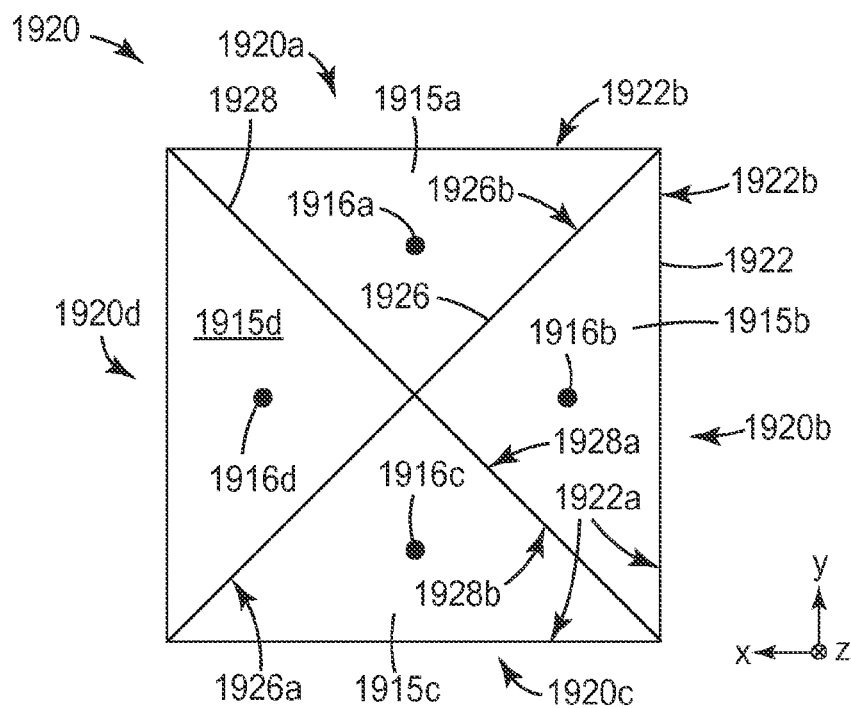
FIGS. 19 and 20 are schematic cross-sectional or end views of composite tubes, each composite tube comprising multiple individual light transmissive tubes whose longitudinal axes are parallel to each other, and each individual tube having at least one side that is light transmissive and at least one side that may be reflective and opaque.
Figure 20:
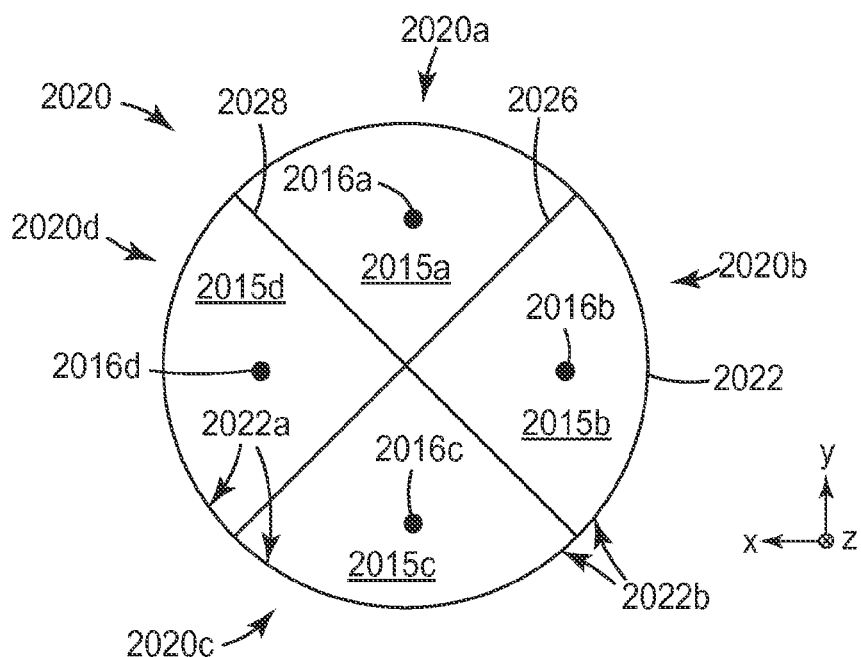

FIGS. 19 and 20 show more light-transmissive tube construction configurations. The light-transmissive tubes of these figures can be considered to be composite tubes that include multiple individual light transmissive tubes whose longitudinal axes are parallel to each other, where each individual tube has at least one side that is light transmissive and at least one side that may be reflective and opaque.

Thus, for example, the light transmissive tube 1920 of FIG. 19 includes a structured film or structured film combination 1922 that defines a cavity and a longitudinal axis parallel to the z-axis. An inner structured surface 1922*a* of the film 1922 faces the cavity, and an outer structured surface 1922*b* faces away from the cavity. The inner and outer structured surfaces 1922*a*, 1922*b* include elongated features as discussed above to redirect light injected into the cavity outwardly from the emitting area of the tube, and to form one or more virtual filaments. In this embodiment, the tube includes a crossed pair of divider walls 1926, 1928 which have the effect of subdividing the original cavity into a plurality of cavities 1915*a*, 1915*b*, 1915*c*, and 1915*d*, and the original tube into a plurality of light-transmissive tubes 1920*a*, 1920*b*, 1920*c*, 1920*d*. These cavities and tubes extend along respective longitudinal axes 1916*a*, 1916*b*, 1916*c*, and 1916*d*, which are parallel to each other and to the original cavity axis. In one embodiment, the walls 1926, 1928 may be or include highly reflective optical films or bodies, such as 3M™ Vikuiti™ Enhanced Specular Reflector (ESR) film. Alternatively, the walls 1926, 1928 may be or include a multilayer optical film that is tailored to be highly reflective over a more limited portion of the spectrum corresponding to the wavelength of the light injected into the cavities by the light source(s), and to be less reflective and more transmissive at other wavelengths. The high reflectivity provided by such walls 1926, 1928 may be at least 90% for the injected light at a design angle of incidence, such as a representative angle or angle at which the light source(s) inject light into the cavity. As such, the walls 1926, 1928 may be opaque or substantially opaque, e.g., they may have a transmission over the visible spectrum or at another wavelength range of interest of less than 20%, or less than 10%. The wall 1926 has opposed major surfaces 1926a, 1926b and the wall 1928 has opposed major surfaces 1928a, 1928b, and all of these major surfaces may be highly reflective so that little or none of the light injected into a proximal end of a given one of the cavities 1915a through 1915d is transmitted to a neighboring cavity. Alternatively, the walls 1926, 1928 may have lower reflectivities and higher transmission of the injected light to allow for a significant amount of light leakage between neighboring cavities. Separate light source assemblies can be provided for each of the tubes 1920a, 1920b, 1920c, 1920d, or a single light source assembly can be adapted to inject light into each such tube. In either case, one or more discrete light sources, e.g., one or more LEDs, may be provided at the end of the cavity for each tube 1920a, 1920b, 1920c, and 1920d, to inject light into such cavity. A similar light injection arrangement can be provided for the composite tube of FIG. 20 below.

In the embodiment of FIG. 19, the inner structured surfaces of adjacent tubes, such as tubes 1920a and 1920b, may be different portions of a single inner structured surface 1922a. Furthermore, the outer structured surfaces of such adjacent tubes may also be different portions of a single outer structured surface 1922b. Opposed highly reflective surfaces of a wall, such as surfaces 1926a and 1926b of wall 1926, may form parts of neighboring tubes, such as tubes 1920a and 1920b, respectively.

The light-transmissive tube 2020 of FIG. 20 may be similar to the tube of FIG. 19, except that the tube of FIG. 20 forms a circular or curved cross-sectional shape rather than a polygonal shape. Thus, the light transmissive tube 2020 includes a structured film or structured film combination 2022 that defines a cavity and a longitudinal axis parallel to the z-axis, where an inner structured surface 2022a of the film 2022 faces the cavity, and an outer structured surface 2022b faces away from the cavity, and the inner and outer structured surfaces 2022a, 2022b include elongated features as discussed above to redirect light injected into the cavity outwardly from the emitting area of the tube, and provide one or more virtual filaments. The tube 2020 also includes a crossed pair of divider walls 2026, 2028 which have the effect of subdividing the original cavity into a plurality of cavities 2015a, 2015b, 2015c, and 2015d, and the original tube into a plurality of light-transmissive tubes 2020a, 2020b, 2020c, 2020d. These cavities and tubes extend along respective longitudinal axes 2016a, 2016b, 2016c, and 2016d, which are parallel to each other and to the original cavity axis. The walls 2026, 2028 may be or include highly reflective optical films or bodies, as discussed above in connection with FIG. 19. The wall 2026 has opposed major surfaces 2026a, 2026b and the wall 2028 has opposed major surfaces 2028a, 2028b, and all of these major surfaces may be highly reflective, or may be less reflective, as discussed above in connection with FIG. 19. Separate light source assemblies or a single light source assembly can also be provided for the tubes 2020a, 2020b, 2020c, 2020d, as discussed above.

Figure 21:
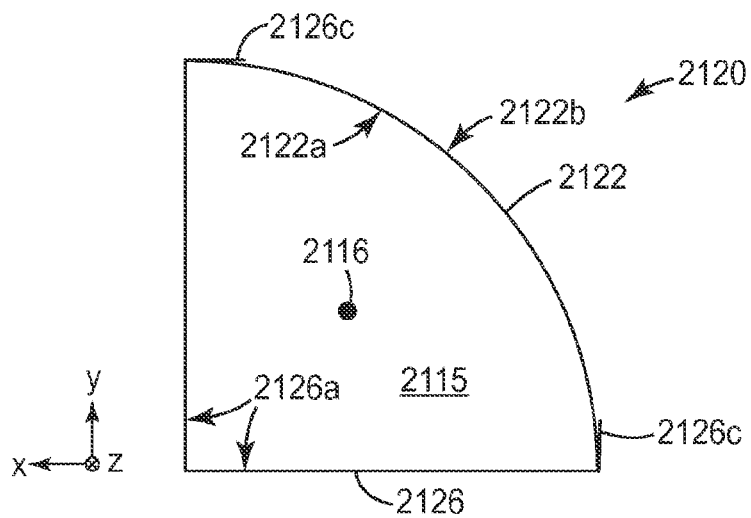
FIGS. 21-23 are schematic cross-sectional or end views of light transmissive tubes, each of which has at least one side that is light transmissive and at least one side that may be reflective and opaque.
Figure 22:
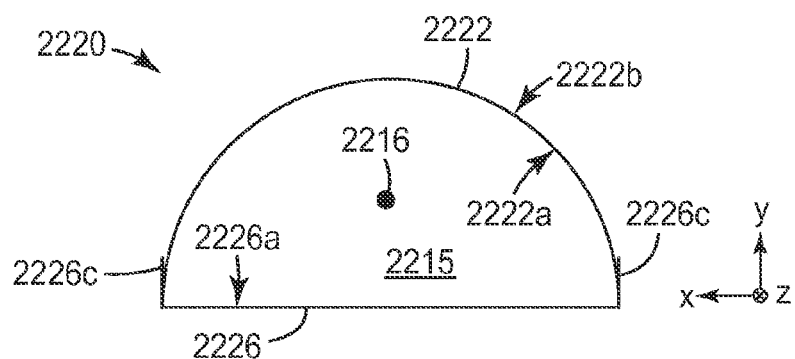
Figure 23:
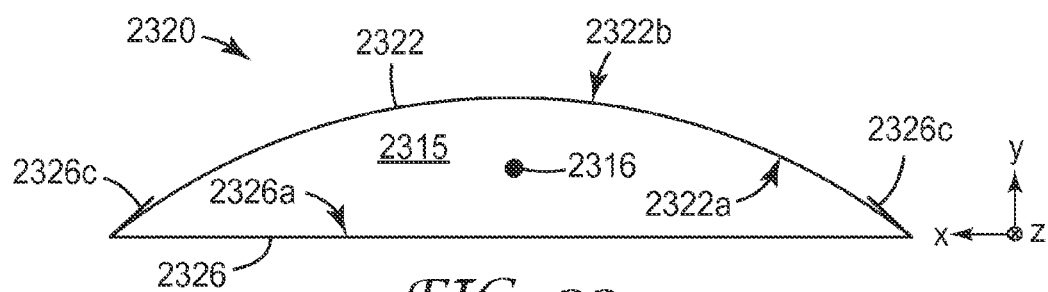

FIGS. 21 through 23 show still more light-transmissive tube construction configurations. In FIG. 21, a light-transmissive tube 2120 includes a wall 2126 to which a structured film or structured film combination 2122, such as those discussed elsewhere herein, is attached. The tube 2120 defines a cavity 2115 and a longitudinal axis 2116. The wall 2126 may be or include a highly reflective optical film or body, to promote light propagation down the tube and out of the structured film. The wall 2126 may thus include a surface 2126a that is highly reflective and substantially opaque. As such, the tube 2120 may in such cases emit light only from the structured film 2122. The wall 2126 is L-shaped and has terminal tabs 2126c to which the structured film 2122 can be attached.

In FIG. 22, a light-transmissive tube 2220 includes a wall 2226 to which a structured film or structured film combination 2222, such as those discussed elsewhere herein, is attached. The tube 2220 defines a cavity 2215 and a longitudinal axis 2216. The wall 2226 may be or include a highly reflective optical film or body, to promote light propagation down the tube and out of the structured film. The wall 2226 may thus include a surface 2226a that is highly reflective and substantially opaque. As such, the tube 2220 may in such cases emit light only from the structured film 2222. The wall 2226 is flat and has terminal tabs 2226c to which the structured film 2222 can be attached.

In FIG. 23, a light-transmissive tube 2320 includes a wall 2326 to which a structured film or structured film combination 2322, such as those discussed elsewhere herein, is attached. The tube 2320 defines a cavity 2315 and a longitudinal axis 2316. The wall 2326 may be or include a highly reflective optical film or body, to promote light propagation down the tube and out of the structured film. The wall 2326 may thus include a surface 2326a that is highly reflective and substantially opaque. As such, the tube 2320 may in such cases emit light only from the structured film 2322. The wall 2326 is flat and has terminal tabs 2326c to which the structured film 2322 can be attached.

Figure 24:
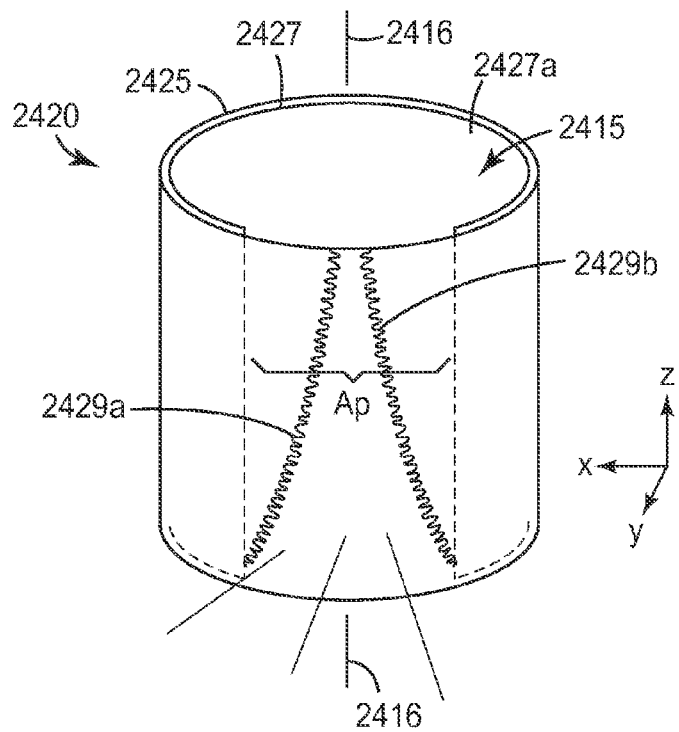
FIG. 24 is a schematic perspective view of a lighting system that includes a highly reflective optical film partially surrounding the cavity to define an elongated aperture for the lighting system.

Still more light-transmissive tube configurations are shown in FIG. 24 and following. The embodiments of FIGS. 24 and 26 (and related figures) show light-transmissive tubes that include one (FIG. 24) or more (FIG. 26) highly reflective optical films that define one (FIG. 24) or more (FIG. 26) elongated apertures of the respective lighting systems.

FIG. 24 depicts a lighting device in which a tube 2420 defines a cavity 2415 into which light is injected by a light source assembly (not shown). The tube 2420 also defines a longitudinal axis 2416. The tube 2420 includes a sleeve 2425, and a structured film or films (not shown in FIG. 24) that provide an inner structured surface with elongated features and an outer structured surface also with elongated features, configured and oriented as described herein. The tube also includes a highly reflective optical film 2427, e.g., a multilayer optical film such as 3M™ Vikuiti™ Enhanced Specular Reflector (ESR) film, or another suitable optical film whose reflectivity is at least 90% for visible light, or for another wavelength range of interest or for the injected light at a design angle of incidence. Similar to the reflective walls discussed above, the highly reflective optical film may be opaque or substantially opaque, e.g., it may have a transmission over the visible spectrum or at another wavelength range of interest of less than 20%, or less than 10%. The reflective film 2427 has an inner major surface 2427a which faces the cavity 2415 and provides the high reflectivity to promote light propagation down the tube. Significantly, the reflective film 2427 is sized so that it only partially surrounds the cavity, to provide an elongated aperture Ap for the lighting system. The structured surface film(s) are disposed at least in the aperture Ap, and in some embodiments are also disposed at other locations around the circumference of the tube. Light injected into the cavity 2415 by discrete light sources interacts with the inner and outer structured surfaces of the tube to provide output light in the area of the aperture Ap, the output light providing the appearance of distinct virtual filaments 2429a, 2429b in the emitting area.

Figure 24A:
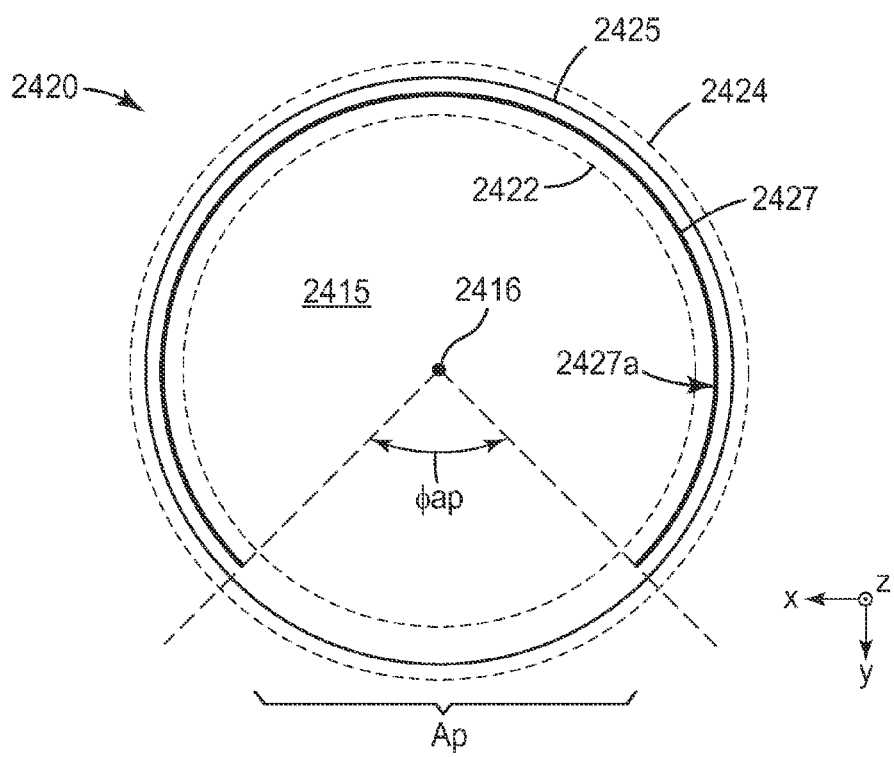
FIG. 24A is a schematic cross-sectional or end view of this lighting system.

FIG. 24A is a view down the longitudinal axis 2416 of the tube 2420. The sleeve 2425, the cavity 2415, the highly reflective film 2427, and the aperture Ap, are carried over from FIG. 24 and need no further explanation. The aperture Ap is shown to subtend an azimuthal angle φap. The structured surface film(s) may be provided in a number of different configurations. In one configuration, a structured optical film having the inward-facing structured surface can be provided at 2422 and a separate structured optical film having the outward-facing structured surface can be provided at 2424 as shown, where both such films wrap entirely around the circumference of the tube. As such, the highly reflective film 2427 and the sleeve 2425 are sandwiched between the structured optical films. Alternatively, the sleeve 2425 can be omitted, such that the highly reflective film 2427 is sandwiched directly between the structured optical films. A tube of this type may be made by taking a piece of the highly reflective film 2427 that is smaller than a piece of one of the structured optical films, and laminating or otherwise attaching the piece of highly reflective film to a major surface (e.g. the smooth major surface) of the structured optical film so that the highly reflective film attaches to the structured optical film over substantially an entire major surface of the highly reflective optical film. The other structured optical film may be similarly attached on the opposite side of the highly reflective film, and the film combination may then be rolled or folded up to form the aperture tube. (Note that attachment of structured optical films to other films or bodies, whether in this embodiment or other disclosed embodiments, may be made at a smooth major surface of the structured optical film so as to preserve the air/polymer interface at the structured surface, or attachment can instead be made at the structured surface of the structured optical film if a sufficiently low refractive index adhesive, e.g. an ultra low index (ULI) adhesive, is used.) Alternatively, the inner and outer structured surfaces may be provided on a single film or film combination, which may then be provided either interior to the highly reflective film 2427 (see 2422) or exterior to such highly reflective film 2427 (see 2424).

Figure 24B:
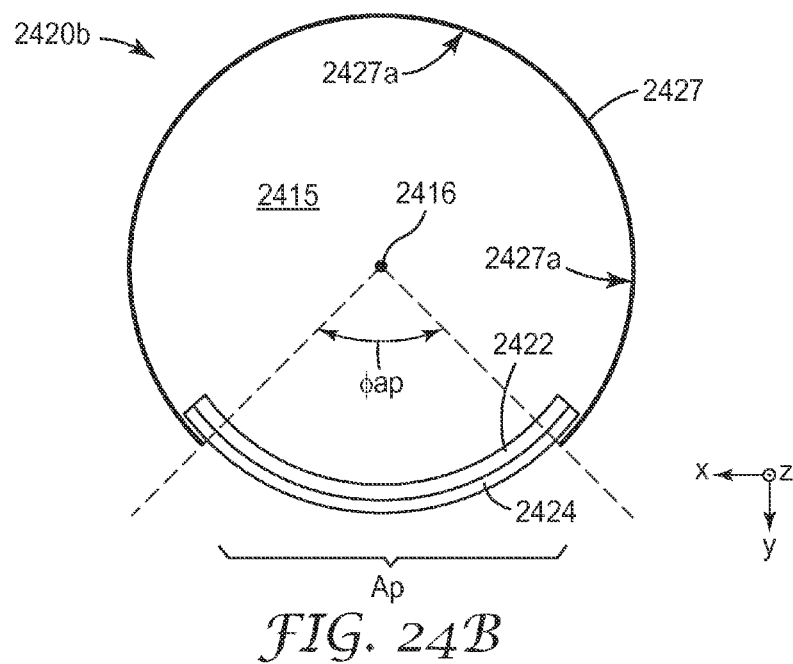
FIG. 24B is a schematic cross-sectional or end view of a lighting system having a highly reflective film to define an elongated aperture similar to FIGS. 24 and 24A, but using a different construction arrangement.
Figure 24C:
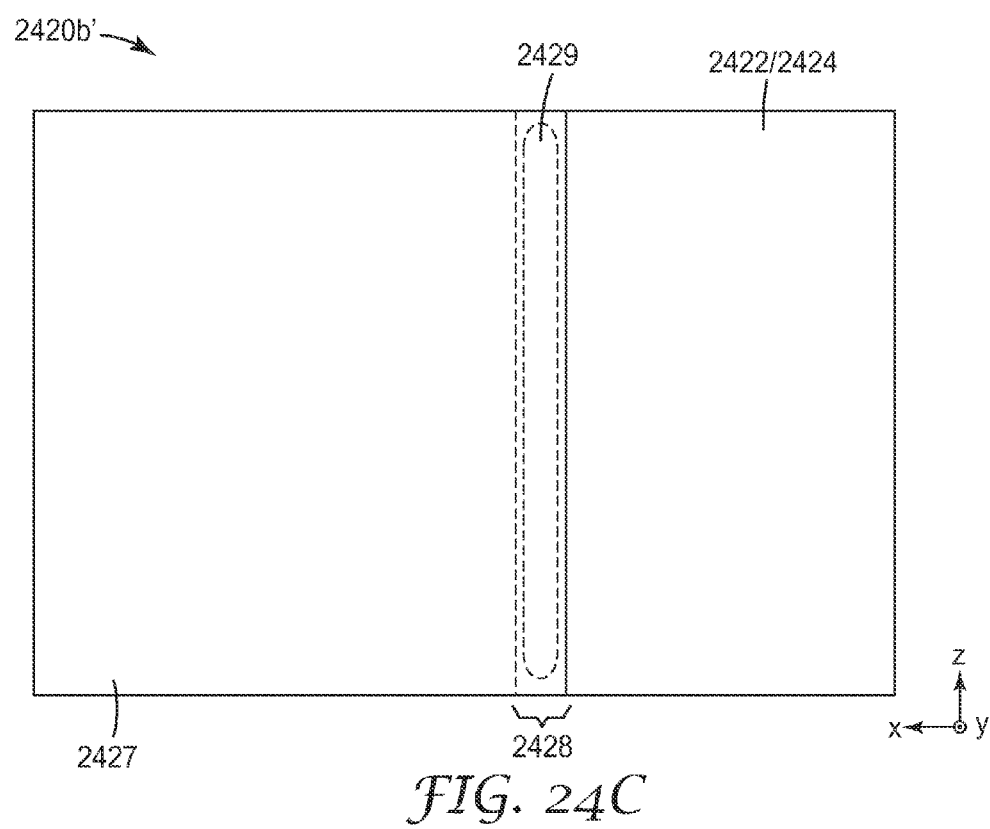
FIG. 24C is a schematic plan view of a flattened tube corresponding to the tube of FIG. 24B, the component films being in the form of strips attached to each other along a region of partial overlap.
Figure 24D:
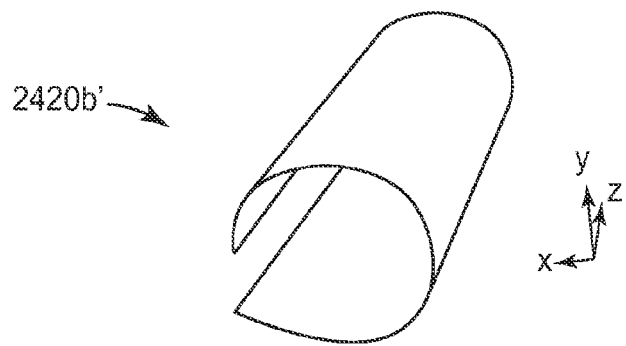
FIG. 24D is a schematic perspective view illustrating how the flattened tube of FIG. 24C can be rolled up to form a tube.

FIG. 24B shows an alternative embodiment in which smaller pieces of the structured optical films are used, which reduces waste and reduces material costs. Thus, the tube 2420b of FIG. 24B may be similar to tube 2420 shown in FIG. 24A, with like reference numbers referring to like elements, except that small pieces of a structured optical film 2422 having an inner structured surface and structured optical film 2424 having an outer structured surface are used. The smaller pieces only partially surround the cavity 2415, and partially overlap with the highly reflective film 2427 to allow attachment thereto. By breaking the attachment on one side and unrolling the films, a flattened tube 2420b', shown in FIG. 24C, is produced. In this embodiment, 2428 refers to one of the regions of partial overlap of the reflective film with the structured optical film combination 2422/2424. Attachment can be made in this region e.g. using a suitable adhesive 2429. The combination of FIG. 24C provides a first strip of at least one structured optical film, the first highly reflective optical film being a second strip, the first and second strips partially overlapping to define an overlap region and attached to each other along the overlap region. The flattened tube 2420b' may then be rolled up in the form of a tube, as shown schematically in FIG. 24D. The reader will appreciate that, in this and other embodiments, the films may be rolled or folded up with no twisting as shown in FIG. 24D or (the reverse process of) FIG. 6, or they may instead be rolled or folded up with twisting or shifting of the opposed vertical edges along the z-direction, such that the relative orientation of the elongated structured with respect to the longitudinal axis of the tube can be tailored as desired without having to change the structured surface tooling in a structured film line. An example of such twisting can be appreciated in the manufacture of conventional cardboard tubes.

Figure 25A:
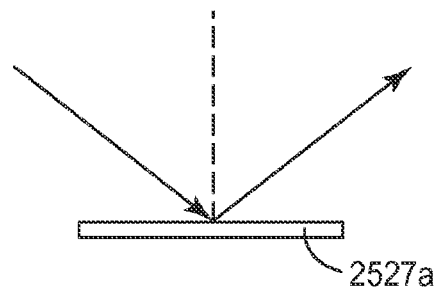
FIGS. 25A, 25B, and 25C are schematic side views of reflective films that respectively depict specular reflection, diffuse reflection, and semi-specular reflection.
Figure 25B:
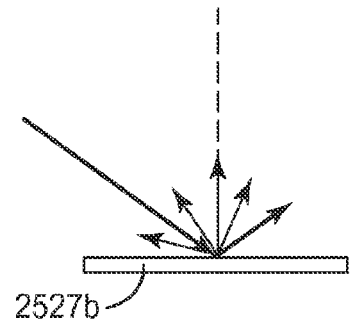
Figure 25C:
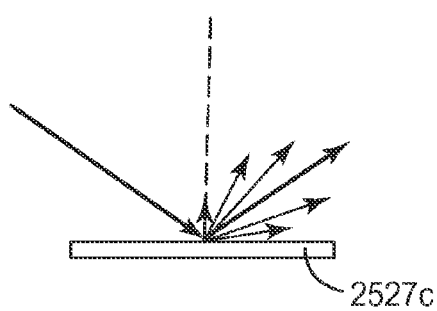

FIGS. 25A, 25B, and 25C are schematic side views of reflective films that respectively depict specular reflection, diffuse reflection, and semi-specular reflection. The reflective and highly reflective surfaces and films used in the disclosed lighting systems may assume any of these characteristics as needed. Such reflectors can be used in two primary ways. The first use is as an endcap on the distal end of the tube opposite of the light source as shown in FIG. 1, element 118. The second use for reflectors in the lighting systems of the present case is to cover a portion of the length of the tube to promote additional transport of light in the tube and to provide for directional control of where the light is directed by creating defined apertures where the light can exit the lighting tube, e.g. as shown in FIG. 24B. The nature of the reflector can significantly affect how the light responds in the system, and the choice of reflector is based on is use and application.

A pure specular reflector, sometimes referred to as a mirror, performs according to the optical rule that "the angle of incidence equals the angle of reflection." This is seen in FIG. 25A, where a single light ray incident on reflector 2527a results in a single reflected ray with the same angle of reflection. This type of reflector used in a tubular lighting system provides maximum lateral transport of the light down the length of a tube, since the collimated light remains collimated as it travels down the tube experiencing reflections off of the specular reflective surface, i.e., no angular mixing occurs based on interactions with the specular reflector, since there is no mechanism to convert light propagating at a given incidence angle to other incidence angles. A specular endcap will accept light that travels to the end of the tube and if the cap is flat will direct it back down the tube toward the light source from which it came. If angular spreading is desired, the specularly reflective endcap can be shaped so as to provide for modification and spreading of the rays through reflection off of a non-planar surface.

A purely Lambertian reflector, on the other hand, redirects light rays equally in all directions as is shown in FIG. 25B. The same initially launched oblique light ray is immediately scattered off of Lambertian (diffuse) reflector 2527b and is scattered in all directions. Some of the reflected light travels "forward" (generally to the right as seen hi the figure), but an equal amount travels "backward" (generally to the left). By forward scattering, we refer to the lateral or in-plane (in a plane parallel to the scattering surface in question) propagation components of the reflected light. When repeated, this process greatly diminishes the forward directed component of a light ray after several reflections. The beam is rapidly dispersed, producing minimal lateral transport. When used as an endcap reflector this diffuse reflection causes rapid spreading of the rays and emission of light from the tube.

A semi-specular reflector provides a balance of specular and diffusive properties. In the hollow cavity this can be advantageous to control the amount the level of propagation of the light by selective controlled spreading. The reflected portion of the same initially launched oblique light ray strikes the reflector 2527c in FIG. 25G, and is substantially forward-scattered in a controlled amount. The reflected cone of light is diffused but primarily in a "forward" direction. Semi-specular reflectors can thus be seen to promote the controlled levels of spreading of light in a reflective cavity, which can enhance adequate mixing of light ray directions to enhance uniformity, while still allowing for light propagation down the tube axis. Reflectors that are partially diffuse but that have a substantially forward directed component will transport more light across a greater distance with fewer total reflections of the light rays. We may describe a semi-specular reflector as one that provides substantially more forward scattering than reverse scattering.

Figure 26:
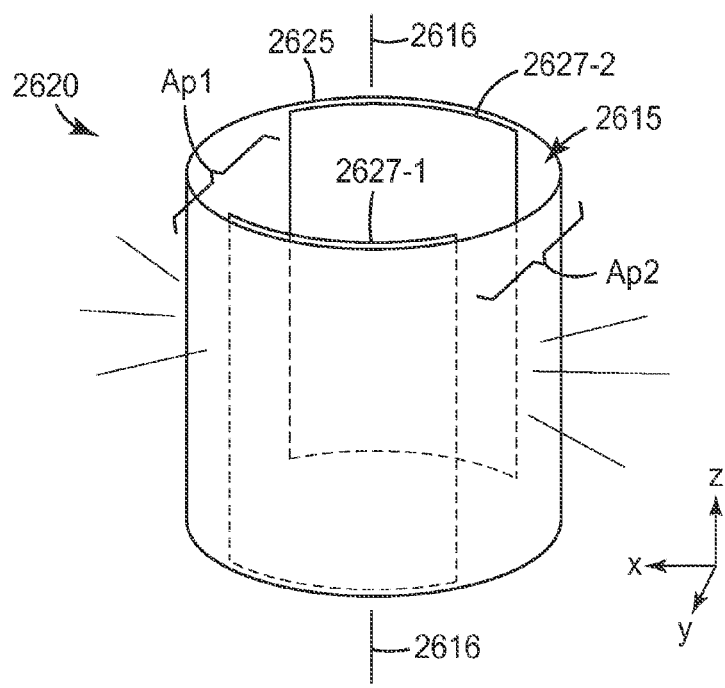
FIG. 26 is a schematic perspective view of a lighting system that includes two highly reflective optical films partially surrounding the cavity to define two elongated apertures for the lighting system.

FIG. 26 shows a lighting device having a light-transmissive tube 2620 similar to that of FIG. 24, except that two pieces of highly reflective film are used to form two elongated apertures. Thus, FIG. 26 depicts a lighting system in which a tube 2620 defines a cavity 2615 into which light is injected by a light source assembly (not shown). The tube 2620 also defines a longitudinal axis 2616. The tube 2620 includes a sleeve 2625, and a structured film or films (not shown in FIG. 26) that provide an inner structured surface with elongated features and an outer structured surface also with elongated features, configured and oriented as described herein. The tube also includes two highly reflective optical films 2627-1, 2627-2, which are similar to the film 2427 of FIG. 24. The reflective films 2627-1, 2627-2 have inner major surfaces that face the cavity 2615 and provide the high reflectivity to promote light propagation down the tube. The reflective films 2627-1, 2627-2 are both sized so that they only partially surround the cavity, and are separated from each other, to provide two elongated apertures Ap1, Ap2 for the lighting device. The structured surface film(s) are disposed at least in these apertures, and in some embodiments are also disposed at other locations around the circumference of the tube.

Figure 26A:
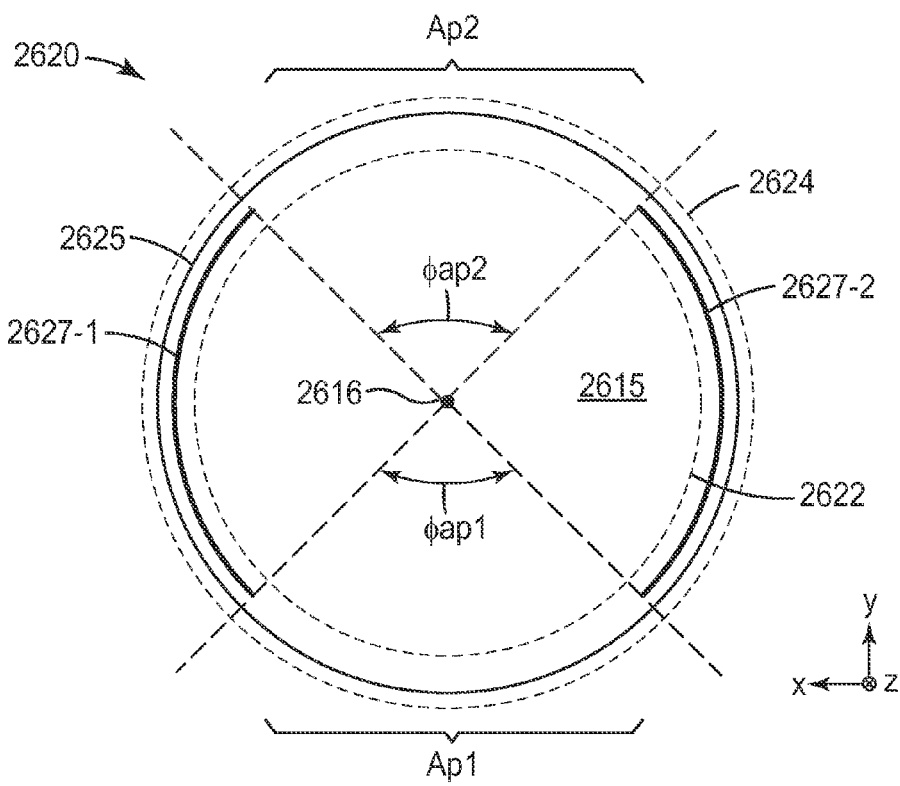
FIG. 26A is a schematic cross-sectional or end view of this lighting system.

FIG. 26A is a view down the longitudinal axis 2616 of the tube 2620. The sleeve 2625, the cavity 2615, the highly reflective films 2627-1 and 2627-2, and the apertures Ap1 and Ap2, are carried over from FIG. 26 and need no further explanation. The apertures are shown to subtend azimuthal angles φap1, φap2 respectively. The structured surface film(s) may be provided in a number of different configurations. In one configuration, a structured optical film having the inward-facing structured surface can be provided at 2622 and a separate structured optical film having the outward-facing structured surface can be provided at 2624 as shown, where both such films wrap entirely around the circumference of the tube. As such, the highly reflective films and the sleeve 2625 are sandwiched between the structured optical films. Alternatively, the sleeve 2625 can be omitted, such that the highly reflective films 2627-1, 2627-2 are sandwiched directly between the structured optical films. A tube of this type may be made by taking pieces of the highly reflective film that are smaller than a piece of one of the structured optical films, and laminating or otherwise attaching the pieces of highly reflective film to a major surface (e.g. the smooth major surface) of the structured optical film so that the highly reflective films attach to the structured optical film over substantially their entire major surfaces. The other structured optical film may be similarly attached on the opposite side of highly reflective films, and the film combination may then be rolled or folded up to form the aperture tube. Alternatively, the inner and outer structured surfaces may be provided on a single film or film combination, which may then be provided either interior to the highly reflective films or exterior to such highly reflective films.

Figure 26B:
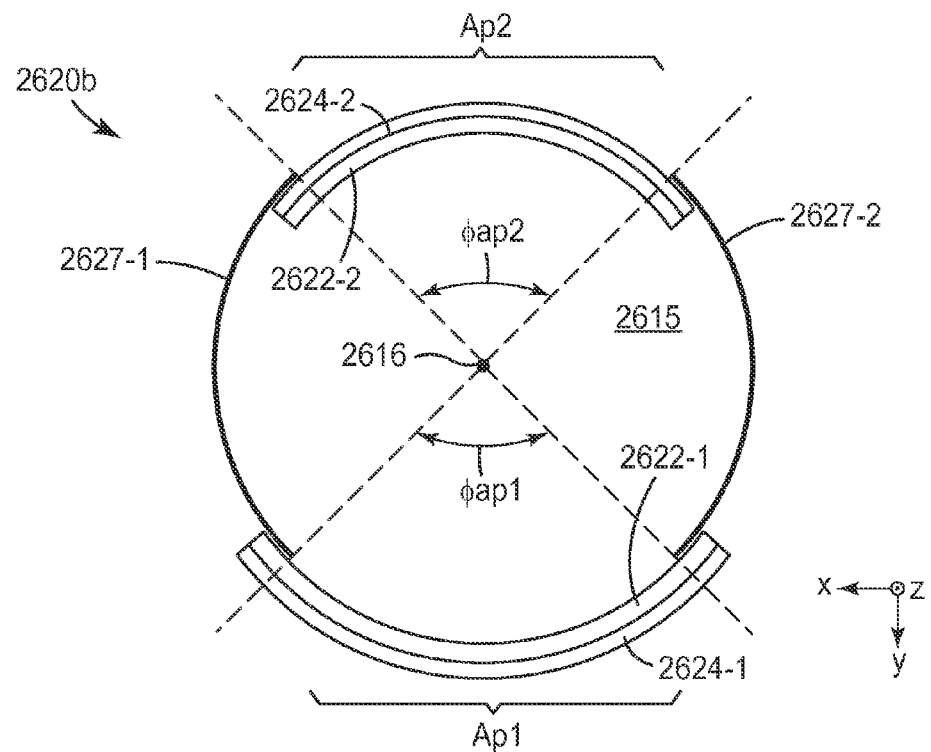
FIG. 26B is a schematic cross-sectional or end view of a lighting system having two highly reflective films to define two elongated apertures similar to FIGS. 26 and 26A, but using a different construction arrangement.
Figure 26C:
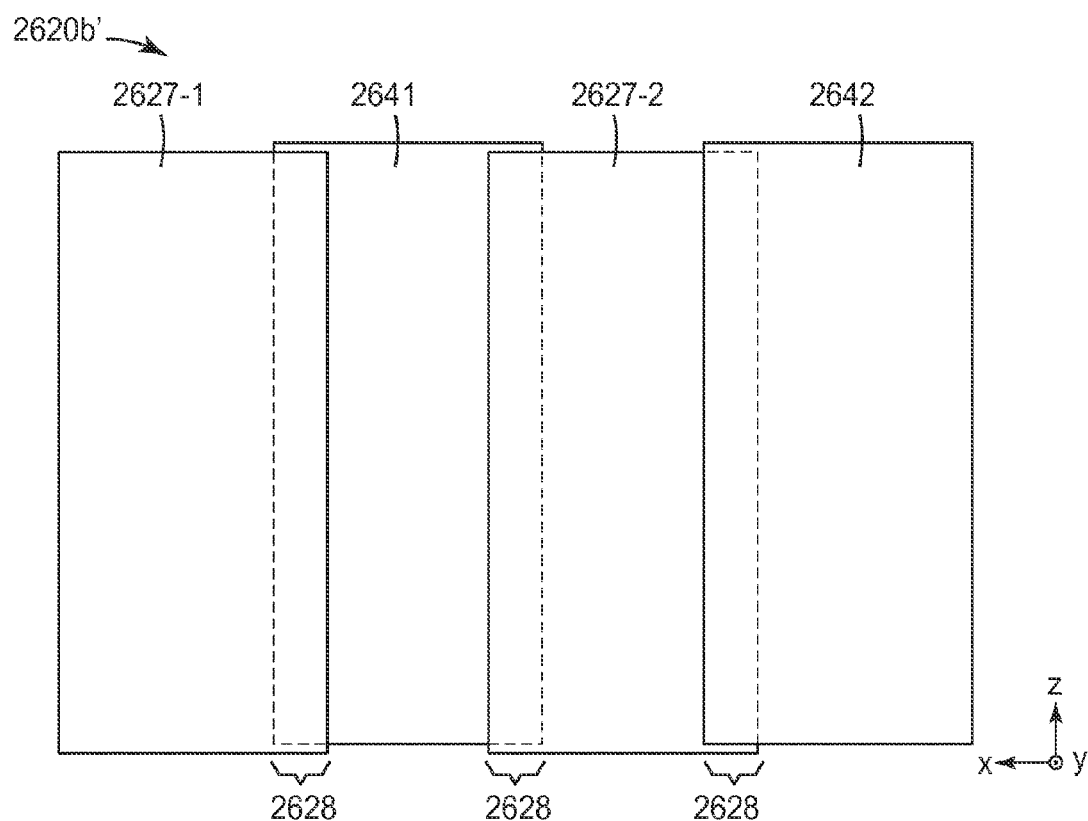
FIG. 26C is a schematic plan view of a flattened tube corresponding to the tube of FIG. 26B, the component films being in the form of strips attached to each other along regions of partial overlap.

FIG. 26B shows an alternative embodiment in which smaller pieces of the structured optical films are used, which reduces waste and reduces material costs. Thus, the tube 2620b of FIG. 26B may be similar to tube 2620 shown in FIG. 26A, with like reference numbers referring to like elements, except that small pieces of structured optical films 2622-1, 2622-2, having an inner structured surface, and structured optical films 2624-1, 2624-2, having an outer structured surface, are used. The smaller pieces only partially surround the cavity 2615, and partially overlap with the highly reflective films to allow attachment thereto. By breaking the attachment on one side and unrolling the films, a flattened tube 2620b', shown in FIG. 26C, is produced. In this embodiment, 2628 refers to regions of partial overlap of the reflective film with the structured optical film combination. Attachment can be made in this region e.g. using a suitable adhesive. The combination of FIG. 26C provides a first strip of at least one structured optical film, and a second strip of highly reflective optical film, the first and second strips partially overlapping to define an overlap region and attached to each other along the overlap region. The flattened tube 2620b' may then be rolled up as discussed elsewhere herein.

EXAMPLES

The foregoing principles were used to fabricate several lighting devices having one or more of the features and characteristics discussed above. In the process of making these devices, the following materials or components were used:

Microreplication Tools: microreplication tools were used to fabricate various microstructured optical films having structured surfaces containing elongated surface features. The tools were made using two methods. The first commonly known method used was diamond turning. The second method is described in patent application publication US 2005/0024754 A1 (Epstein et al.). Metallic cylindrical tool patterns were cut into the copper surface of the tool using either a precision diamond turning or engraving machine. The resulting copper cylinders with precision-cut features was nickel plated and treated for release using processes as described in U.S. Pat. No. 5,183,597 (Lu).

Turning Film: a film having linear prismatic features, similar in shape to those shown in FIG. 8, was made using a metallic cylindrical tool pattern. Each prismatic feature in the tool pattern had a symmetric triangular cross section, with a prism apex angle (included angle) of 70 degrees. The prismatic features were arranged side-by-side in an array (see again FIG. 8), the pitch of the prismatic features being 50 microns. Using this structured tool, a structured surface optical layer was made using an acrylate resin including acrylate monomers and a photoinitiator that was cast onto a primed PET support film (5 mils in thickness), and was then cured against the precision cylindrical tool using ultraviolet light. The resin was a 75/25 mixture by weight of CN120 (an epoxy acrylate oligomer available from Sartomer Company, Exton, Pa.) and Phenoxyethyl acrylate (available from Sartomer under the name SR339) with a photoinitiator package composed of 0.25% by weight of Darocur 1173 and 0.1% by weight Darocur TPO (both available from Ciba Specialty Chemicals Inc.). When cured, the resin provided a solid polymeric material with a refractive index of 1.57 and a structured surface of linear prismatic features as described, Aspheric Lenticular Film: a film having linear lenticular features, similar in shape to those shown in FIG. 9, was made using a metallic cylindrical tool pattern where the shape was aspheric (i.e., having a different radius of curvature at different locations on the curved cross-sectional shape) and made using the diamond shown in FIG. 11 of patent application publication US 2013/258709 (Thompson et al.). Using this tool, a structured surface optical layer was made using an acrylate resin including acrylate monomers and a photoinitiator that was cast onto a primed PET support an (2 mils in thickness) and was then cured against the precision cylindrical tool using ultraviolet light. The resin was a 75/25 mixture by weight of CN120 (an epoxy acrylate oligomer available from Sartomer Company, Exton, Pa.) and Phenoxyethyl acrylate (available from Sartomer under the name SR339) with a photoinitiator package composed of 0.25% by weight of Darocur 1173 and 0.1% by weight Darocur TPO (both available from Ciba Specialty Chemicals Inc.). When cured, the resin provided a solid, transparent polymeric material with a refractive index of 1.57 and a structured surface of side-by-side linear, aspheric lenticular features.

2-D structured film: an optical film having a structured surface similar to that of FIG. 11 was made. The structured surface comprised an array of elongated continuous undulating features occupying an x-y plane thereof, wherein each feature in the array comprised two inclined surfaces that met to form a ridge. Each ridge was substantially continuous and undulating in the x-y plane. Each ridge was also characterized in that it did not lie in the y-z plane (normal to the x-y plane), but rather in a plane that intersected the x-y plane obliquely. The width of each feature (measured along the y-direction) and the height of each feature (measured along the z-direction and defined by the ridge) undulated or varied along the y-direction or feature axis (refer in this regard to feature axis 1121-1 in FIG. 11). The x-y curvature (curvature in the x-y plane) and the x-z curvature (curvature in the x-z plane) of each feature also undulated along the y-direction or feature axis. An optical layer (optical film) having this undulating structured surface was made using an acrylate resin including acrylate monomers and a photoinitiator that was cast onto a primed PET support film (5 mils in thickness) and. was then cured against the precision cylindrical tool using ultraviolet light to form a cured resin layer, the resin having a refractive index of about 1.586. The optical film is described in connection with FIGS. 7a-e of U.S. Pat. No. 7,695,180 (Schardt et al.). The optical film had a nominal overall thickness of about 6 mils. The features in each prism on the structured surface had a characteristic length λ (see FIG. 7e of U.S. Pat. No. 7,695,180 (Schardt et al.)) of approximately 150 μm, a maximum and minimum width Wmax, Wmin of approximately 68 μm and 4 μm respectively, and a maximum and minimum height Hmax, Hmin of about 25 μm and 1 μm respectively. The inclined prism surfaces of each prism were substantially flat in transverse cross-section (see the y-z plane of FIG. 7d of U.S. Pat. No. 7,695,180 (Schardt et al.)) and formed an apex angle therebetween of approximately 96 degrees, The prisms had a structural asymmetry as depicted in FIGS. 7b-e of the '180 patent, where the cant angle θ was approximately 19 degrees.

Crossed Aspheric Lenticular Film: a two-sided replicated film was made in which the two opposed major surfaces of the film were each provided with a structured surface of linear aspheric lenticular features, similar to those shown in FIG. 9, and where the lenticular features of the two sides were oriented orthogonal to each other. To make this film, a metallic cylindrical tool was used as described above in connection with the Aspheric Lenticular Film. The elongation axis of each lenticular feature in the structured surface of the tool was oriented at an angle of 45 degrees relative to the cylindrical axis of the tool. Using this precision cylindrical tool, a first structured surface optical layer was made on a first side of a support film using an acrylate resin including acrylate monomers and a photoinitiator. The acrylate resin was cast onto a primed PET support film (5 mils in thickness), and was then cured against the cylindrical tool using ultraviolet light. The resin was a 75/25 mixture by weight of CN120 (an epoxy acrylate oligomer available from Sartomer Company, Exton, Pa.) and Phenoxyethyl acrylate (available from Sartomer under the name SR339) with a photoinitiator package composed of 0.25% by weight of Darocur 1173 and 0.1% by weight Darocur TPO (both available from Ciba Specialty Chemicals Inc.). When cured, the resin provided a solid, transparent polymeric material layer with a refractive index of 1.57. Using the same precision cylindrical tool and the same acrylate resin, a second structured surface optical layer was made on the opposite or second side of the 5 mil PET support film. The two structured surfaces on opposites sides of the same substrate were oriented orthogonally relative to each other, such that the elongation axis of lenticular features on one side made an angle (see e.g. angle γ in FIG. 7B) of 90 degrees relative to the elongation axis of the lenticular features on the opposite side.

The foregoing materials and components were used to fabricate several lighting devices having one or more of the features and characteristics discussed above.

First Embodiment. In a first embodiment, a transparent sleeve made of polycarbonate was obtained. The sleeve had a length of 53 mm. In transverse cross-section, the sleeve was circular in shape, with an outer diameter of 60 mm and an inner diameter of 53 mm. Thus, the sleeve, and the cavity it defined, had an aspect ratio L/W (see FIG. 1) of about 1. Inside of this sleeve was placed a film laminate having structured surfaces on both sides. The film laminate consisted essentially of the Turning Film described above laminated to the Aspheric Lenticular Film described above. These films were laminated to each other using a 2 mil optically clear adhesive (product code 8172CL, available from 3M Company) such that the structured surfaces of the two films faced away from each other and were exposed to air. The resulting film laminate was flexible, and sized so that when it was curled up inside the sleeve, it covered substantially the entire inside surface of the sleeve without the optical film overlapping upon itself. The film laminate was placed such that the structured surface of the Aspheric Lenticular Film faced outwardly from the cavity defined by the sleeve, this structured surface also contacting the inside surface of the sleeve, and the structured surface of the Turning Film faced inwardly towards the cavity. The structured surfaces of the film laminate were oriented such that any given elongated feature on the structured surface had an axis of elongation that was perpendicular to the longitudinal axis of the sleeve and cavity (i.e., perpendicular to the nominal propagation direction of the injected light from the LEDs). That is, in reference to the flattened tube 720a' of FIG. 7A, $\alpha=\beta=90$ degrees, such that the elongated features produced rings as shown schematically in FIGS. 3A and 3B. The curled-up optical film laminate formed a light-transmissive tube together with the transparent sleeve. The tube was made to be closed-ended by covering its distal end with a flat, round disk of a reflective polarizer film, 3M™ Vikuiti™ DBEF-D2-400. The reflective polarizer film reflects about 50% of incident broadband unpolarized visible light and transmits the remaining 50%.

Figure 27A:
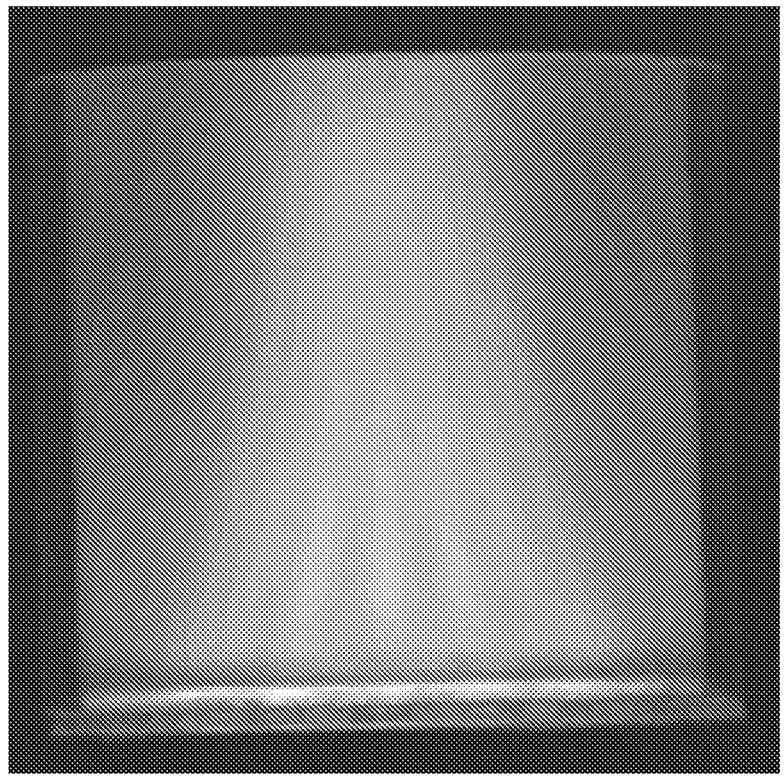
FIG. 27A is a grayscale photograph of a lighting device that exhibits a pattern of virtual filaments, this lighting device having prismatic features on the structured surface facing the cavity and lenticular features on the structured surface facing away from the cavity.
Figure 27B:
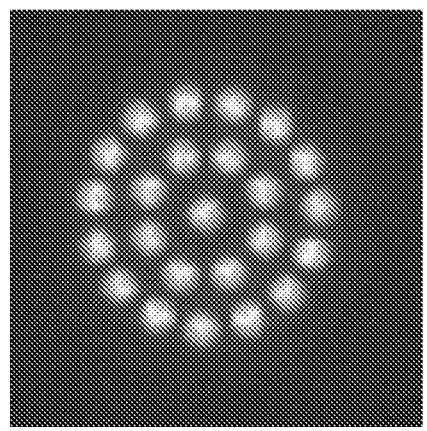
FIG. 27B is a photograph of the arrangement of LED light sources that was used in the lighting device of FIG. 27A.

The other end (the proximal end) of the tube was coupled to a light source assembly. The light source assembly comprised 24 discrete LED light sources mounted on a base in an MR16 lamp, product code 201104 from Eveready Battery Company, inc. The 24 LED sources in the assembly each emitted nominally white light with a color temperature of 3000 K. and they were arranged in a concentric circle pattern in plan view as shown in FIG. 27B. Also, each discrete LED source was packaged in a form referred to in the industry as a 5050 SMD LED, or 50/50 SMD LED, in which three LED dies illuminate a phosphor material. The diameter of the outermost circle of 15 LED sources, i.e., the largest center-to-center distance between LED sources in the light source assembly, was about 36 mm. The proximal end of the light-transmissive tube was placed in contact with the light source assembly such that the single LED at the center of the concentric circle pattern was aligned with the longitudinal axis and with the center of curvature of the tube. The light source assembly was connected to a power source which energized all 24 of the LEDs, each of which injected light into the cavity defined by the tube. The injected light was converted by the structured surfaces of the optical films into output light that was emitted over substantially the entire outer surface of the tube. When the emitting area of the tube was viewed directly, the output light produced a pattern of virtual filaments, the filaments appearing to be located inside the tube. A grayscale photograph of the emitting area of the tube, taken using a digital camera system (available under the trade designation ProMetric™ from Radiant Zemax, LLC, Redmond, Wash.), using a 105 mm lens and ND1 filter from a distance of about 1.5 meters, and at a polar angle θ of about 90 degrees, is shown in FIG. 27A. From the perspective of this figure, the individual LEDs are located at the bottom of the emitting area, and the reflective polarizer cap is located at the top of the emitting area. A number of distinct filaments can be seen in the photograph, with filaments at the left side of the pattern having arced shapes that are oppositely curved relative to filaments at the right side of the pattern, and with a centrally located filament that is substantially straight. Due to their different shapes and curvatures, the filaments are farthest apart from each other, and most distinctive, at the proximal end of the tube (near the LEDs), and closest to each other, and least distinctive, at the distal end of the tube.

Figure 28A:
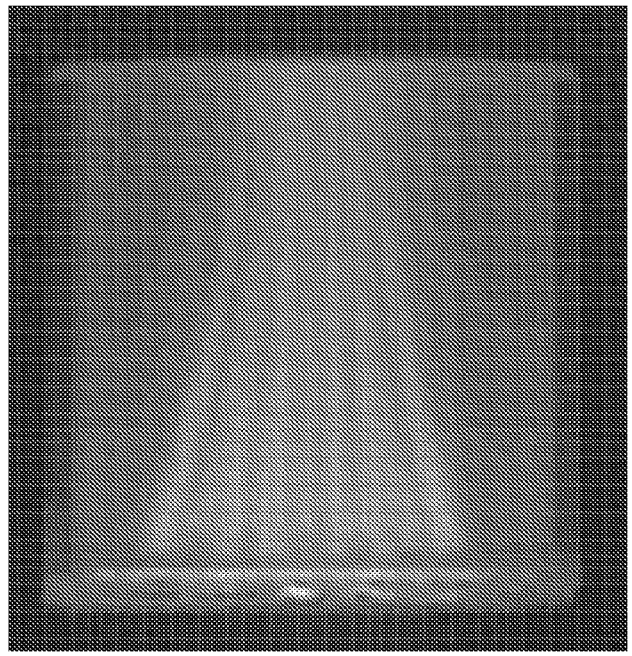
FIG. 28A is a grayscale photograph of another lighting device exhibiting a pattern of virtual filaments, this lighting device having lenticular features both on the structured surface facing the cavity and on the structured surface facing away from the cavity.

Second Embodiment. A second embodiment of a lighting device was made and tested. The second embodiment was substantially similar to the first embodiment of FIG. 27A, except that the Turning Film was replaced with another piece of the Aspheric Lenticular Film. Thus, the same type of Aspheric Lenticular Film that provided the outwardly-facing structured surface also provided the inwardly-facing structured surface of the light-transmissive tube. Other than this, the other aspects of the second embodiment were substantially the same as the first embodiment, including the polycarbonate sleeve and its dimensions, the reflective polarizer cap, the light source assembly, and the orientation of the elongated features of both structured surfaces being perpendicular to the longitudinal axis of the cavity and tube. Just as with the first embodiment, the structured surfaces of the second embodiment converted the light injected into the cavity by the LEDs into output light that was emitted over substantially the entire outer surface of the tube. When the emitting area of the tube was viewed directly, the output light produced a pattern of virtual filaments, the filaments appearing to be located inside the tube. A grayscale photograph of the emitting area of the tube, taken using the same digital camera system in substantially the same manner as in FIG. 27A, is shown in FIG. 28A. From the perspective of this figure, the individual LEDs are located at the bottom of the emitting area, and the reflective polarizer cap is located at the top of the emitting area. A number of distinct filaments can again be seen in the photograph.

Figure 28B:
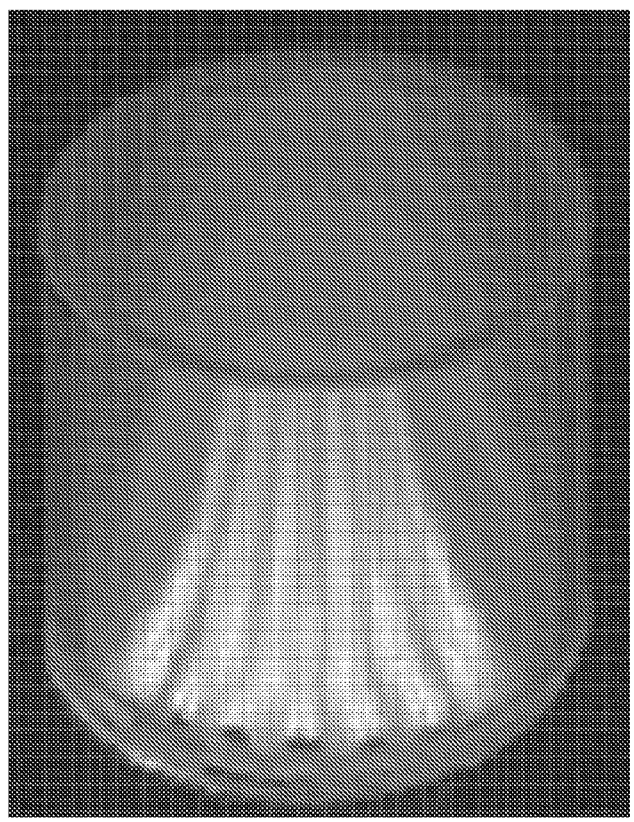
FIG. 28B is a grayscale photograph of the lighting device of FIG. 28A but from a different vantage point, looking down on the device at an oblique polar angle.

The digital camera system was then elevated relative to the lighting device of the second embodiment such that the polar angle decreased to an angle less than 90 degrees, i.e., such that the camera system looked down on lighting device at an oblique angle. A grayscale photograph of the second embodiment taken from this perspective is shown in FIG. 28B. Virtual filaments can still be seen in the emitting area of the lighting device, and the virtual filament pattern has changed shape relative to the pattern of FIG. 28A.

Figure 28C:
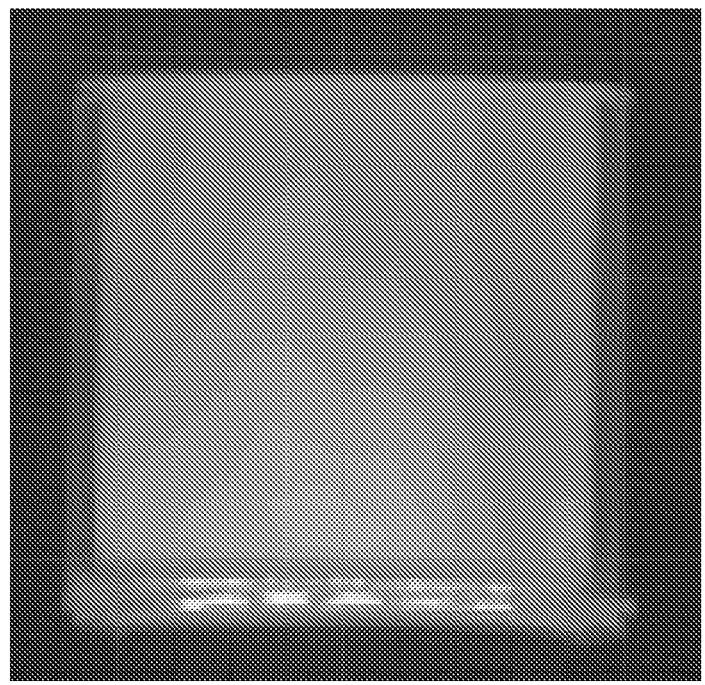
FIG. 28C is a grayscale photograph of a lighting device similar to that of FIG. 28A, except that the structured surfaces are at different orientations such that no virtual filaments are visible.

An embodiment for comparative purposes was made. The comparative embodiment was substantially the same as the second embodiment, except that the structured surfaces and elongated surface features of the optical films were changed in orientation, and were provided as a (single) two-sided replicated film referred to above as the Crossed Aspheric Lenticular film, rather than as a film laminate. Rather than being oriented perpendicular to the longitudinal axis of the cavity and tube, the elongated surface features of both structured surfaces were oriented at 45 degrees relative to the longitudinal axis, and the elongated surface features of one structured surface were oriented perpendicular to the elongated surface features of the other optical structured surface. That is, in reference to the flattened tube 720b' of FIG. 7B, $\alpha=\beta=45$ degrees, and $\gamma 90$ degrees, such that the elongated features formed spirals or helixes (in different directions for the two structured surfaces) as they wound their way along the tube. Although the comparative embodiment emitted light over substantially the entire outer surface of the light-transmissive tube, no virtual filaments could be readily observed in the output area of the lighting device. A grayscale image of the emitting area of the comparative embodiment, taken with the same digital camera system in substantially the same manner as in FIGS. 27A and 28A, is shown in FIG. 28C.

Figure 29:
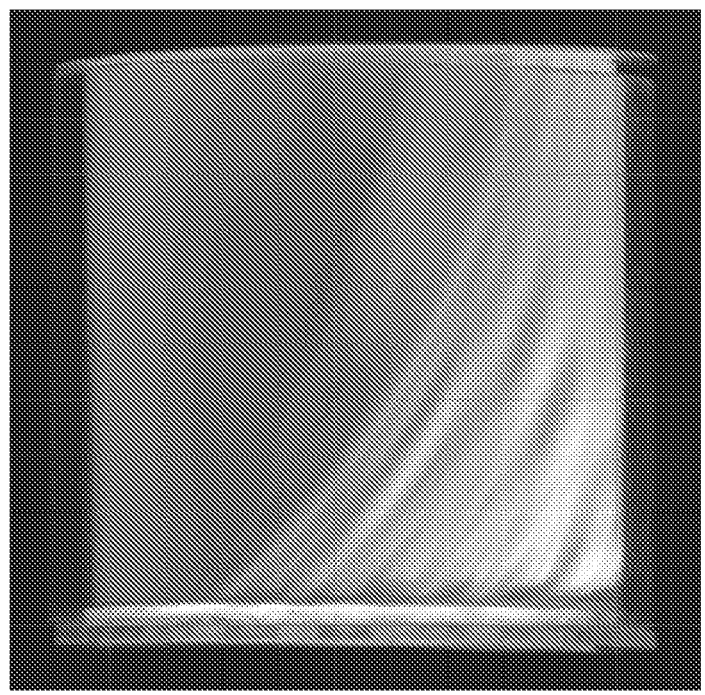
FIG. 29 is a grayscale photograph of a lighting device similar to that of FIG. 28A, except that the structured surfaces are at different orientations such that an asymmetric pattern of virtual filaments is visible.

Third Embodiment. A third embodiment of a lighting device was made and tested. The third embodiment was substantially similar to the second embodiment of FIG. 28A, except that the structured surfaces and elongated surface features of the optical films were changed in orientation—but not in the same manner as in the comparative embodiment. In this case, rather than being oriented perpendicular to the longitudinal axis of the cavity and tube, the elongated surface features of both films were oriented at 45 degrees relative to the longitudinal axis, and the elongated surface features of one optical film were oriented parallel to the elongated surface features of the other optical film. That is, in reference to the flattened tube 720b' of FIG. 7B, $\alpha=\beta=45$ degrees, and $\gamma=0$ degrees, such that the elongated features formed spirals or helixes (in the same direction for the two optical films) as they wound their way along the tube. The third embodiment emitted light over substantially the entire outer surface of its light-transmissive tube, and virtual filaments could be readily observed in the output area of the lighting device. Due to the asymmetry of the elongated surface features relative to the longitudinal axis of the tube, the virtual filaments were also asymmetrical relative to that axis. A grayscale image of the emitting area of the third embodiment, taken with the same digital camera system in substantially the same manner as in FIGS. 27A and 28A, is shown in FIG. 29.

Figure 30A:
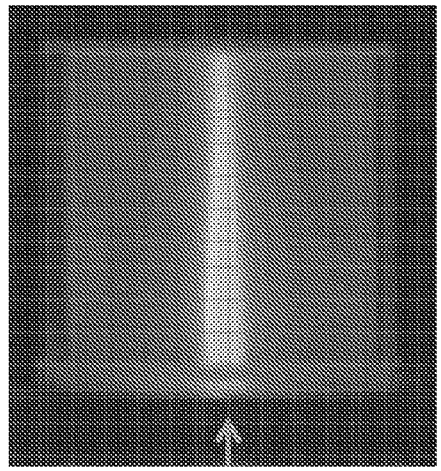
FIG. 30A is grayscale photograph of a lighting device similar to that of FIG. 28A, but where only one LED source, centrally located in the tube, is energized.
Figure 30B:
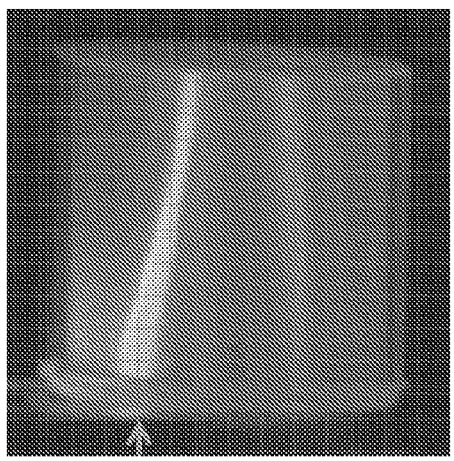
FIGS. 30B and 30C are grayscale photographs of the lighting device of FIG. 30A, but where a single de-centered LED source is energized.
Figure 30C:
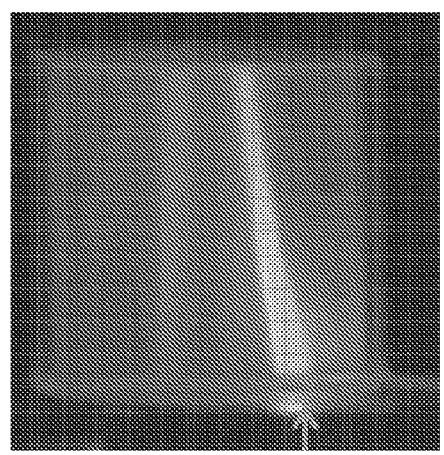

Fourth Embodiment. A fourth embodiment of a lighting device was made and tested. The fourth embodiment was substantially similar to the second embodiment of FIG. 28A, except that a single LED source in the light source assembly could be selected to be turned "on", with the other LED sources remaining "off". In a first case, only the LED source located at the longitudinal axis (and at the center of curvature) of the light-transmissive tube was turned "on". This LED source, which was obtained under product code LUXEON S1000, 3000K, LXS8-PW30 from Philips Lumileds Lighting Company, produced a centrally located, straight virtual filament. A grayscale image of the emitting area was taken with the same digital camera system in substantially the same manner as in FIG. 28A, and is shown in FIG. 30A. The white arrow at the bottom of the image was added to indicate the location of the energized, centrally-located LED source. In a second case, the centrally-located LED source was turned "off" and a single LED light source (of the same type as the centrally located LED source) located an appreciable distance to the left of the longitudinal axis and center of curvature (from the perspective of FIG. 30A) was turned "on". The left-of-center LED produced a curved virtual filament. A grayscale image of the emitting area was taken with the same digital camera system in substantially the same manner as in FIG. 30A, and is shown in FIG. 30B. The white arrow at the bottom of the image was again added, to indicate the location of the left-of-center LED source. In a third case, the left-of-center LED source was turned "off" and a single LED light source (again, of the same type) located an appreciable distance to the right of the longitudinal axis and center of curvature (from the perspective of FIGS. 30A, 30B) was turned "on". The right-of-center LED produced a virtual filament that was curved in an opposite sense to the virtual filament produced by the left-of-center LED. A grayscale image of the emitting area was taken with the same digital camera system in substantially the same manner as in FIGS. 30A and 30B, and is shown in FIG. 30C. The white arrow at the bottom of the image was again added to indicate the location of the right-of-center LED source.

Figure 31:
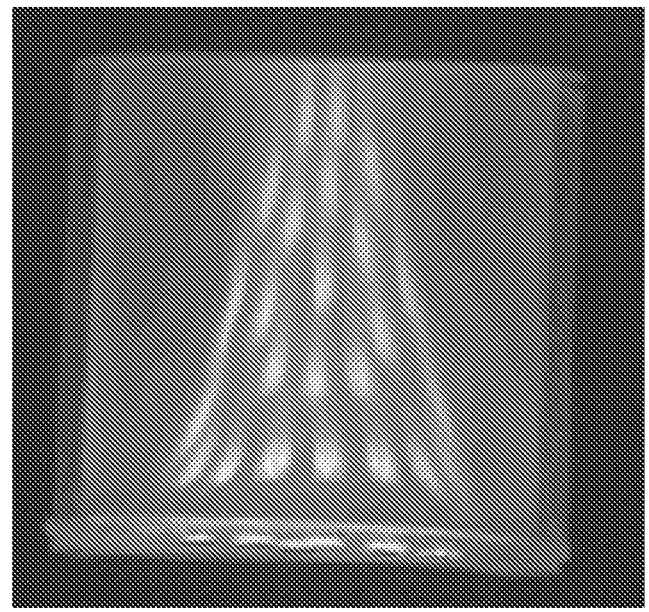
FIG. 31 is a grayscale photograph of a lighting device similar to that of FIG. 27A, but where prismatic features were used on both structured surfaces, which produced virtual filaments that were discontinuous rather than continuous.

Fifth Embodiment. A fifth embodiment of a lighting device was made and tested. The fifth embodiment was substantially similar to the first embodiment of FIG. 27A, except that the Aspheric Lenticular Film was replaced with another piece of the Turning Film. Thus, the same type of Turning Film that provided the inwardly-facing structured surface also provided the outwardly-facing structured surface of the light-transmissive tube. Other than this, the other aspects of the second embodiment were substantially the same as the first embodiment, including the polycarbonate sleeve and its dimensions, the reflective polarizer cap, the light source assembly, and the orientation of the elongated features of both structured surfaces being perpendicular to the longitudinal axis of the cavity and tube. Just as with the first embodiment, the structured surfaces of the fifth embodiment converted the light injected into the cavity by the LEDs into output light that was emitted over substantially the entire outer surface of the tube. When the emitting area of the tube was viewed directly, the output light produced a pattern of virtual filaments, the filaments appearing to be located inside the tube. A grayscale photograph of the emitting area of the tube, taken using the same digital camera system in substantially the same manner as in FIG. 27A, is shown in FIG. 31. From the perspective of this figure, the individual LEDs are located at the bottom of the emitting area, and the reflective polarizer cap is located at the top of the emitting area. Similar to the embodiments of at least FIGS. 27A, 28A, and 29, this embodiment provided a pattern of virtual filaments in the emitting area of the lighting device, the virtual filaments changing shape as a function of azimuthal observation angle. But unlike the embodiments of at least FIGS. 27A, 28A, and 29, each individual virtual filament in the pattern was not a continuous, smooth curve or line. Rather, the virtual filaments of the fifth embodiment were discontinuous or segmented, as can be seen in FIG. 31. By controlling the light source assembly to energize only one discrete LED light source, a single virtual filament that is discontinuous can be produced.

Figure 32:
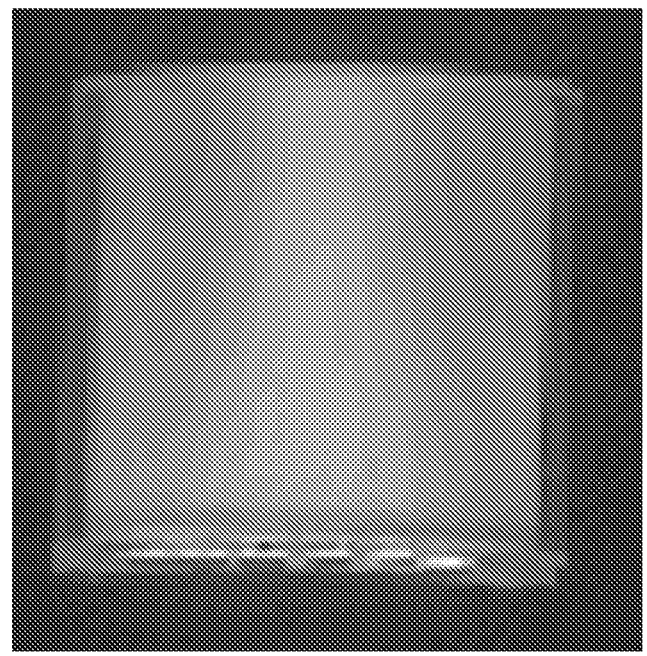
FIG. 32 is a grayscale photograph of a lighting device similar to that of FIG. 28A, but where the structured surface facing away from the cavity was replaced with a structured surface having elongated features that undulate in height and width similar to FIG. 11.

Sixth Embodiment. A sixth embodiment of a lighting device was made and tested. The sixth embodiment was substantially similar to the second embodiment of FIG. 28A, except that one of the pieces of Aspheric Lenticular Film— the one whose structured surface faced outwardly and away from the cavity—was replaced with a piece of the 2-D structured film described above. The structured surface of the 2-D structured film, with its elongated continuous undulating features, thus faced outwardly and away from the cavity, while the structured surface of the Aspheric Lenticular Film faced inwardly and towards the cavity. Unlike the second embodiment, the two structured optical films of this sixth embodiment were not bonded together to form a laminate, but were instead simply placed into the polycarbonate sleeve and flexed to conform to the shape of the sleeve. Other than this, the other aspects of the sixth embodiment were substantially the same as the second embodiment, including the polycarbonate sleeve and its dimensions, the reflective polarizer cap, the light source assembly, and the orientation of the elongated features of both structured surfaces being perpendicular to the longitudinal axis of the cavity and tube. Just as with the second embodiment, the structured surfaces of the sixth embodiment converted the light injected into the cavity by the LEDs into output light that was emitted over substantially the entire outer surface of the tube. When the emitting area of the tube was viewed directly, the output light produced a pattern of virtual filaments, the filaments appearing to be located inside the tube. A grayscale photograph of the emitting area of the tube, taken using the same digital camera system in substantially the same manner as in FIG. 28A, is shown in FIG. 32. From the perspective of this figure, the individual LEDs are located at the bottom of the emitting area, and the reflective polarizer cap is located at the top of the emitting area. Similar to the second embodiment, this sixth embodiment provided a pattern of virtual filaments in the emitting area of the lighting device, the virtual filaments changing shape as a function of azimuthal observation angle, but the virtual filaments were less noticeable, or less clearly defined, than those of the second embodiment.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

The invention claimed is:

1. A lighting device, comprising:
a light-transmissive tube defining a cavity extending along a longitudinal axis, at least a portion of the tube comprising an inner structured surface facing the cavity, and an outer structured surface facing away from the cavity; and
a light source assembly disposed to inject light into the cavity, the light source assembly including one or more discrete LED sources;
wherein the inner and outer structured surfaces are configured to direct a first portion of the injected light out of the tube through the outer structured surface and to direct a second portion of the injected light back into the cavity, such that a virtual filament appears in the tube,
wherein the virtual filament changes shape as a function of azimuthal observation angle.

2. The device of claim 1, wherein the virtual filament has a curved shape at a first azimuthal observation angle, and a straight shape at a second azimuthal observation angle.

3. The device of claim 1, wherein the virtual filament has first and second curved shapes respectively at first and second azimuthal observation angles, and wherein the first and second curved shapes are oppositely curved.

4. A lighting device, comprising:
a light-transmissive tube defining a cavity extending along a longitudinal axis, at least a portion of the tube comprising an inner structured surface facing the cavity, and an outer structured surface facing away from the cavity; and
a light source assembly disposed to inject light into the cavity, the light source assembly including one or more discrete LED sources;
wherein the inner and outer structured surfaces are configured to direct a first portion of the injected light out of the tube through the outer structured surface and to direct a second portion of the injected light back into the cavity, such that a virtual filament appears in the tube;
wherein the portion of the tube further includes a curved portion having a center of curvature, and wherein the one or more discrete LED sources include a first discrete LED source that is not disposed at the center of curvature;
wherein the one or more discrete LED sources further include a second discrete LED source, the second discrete LED source being disposed closer to the center of curvature than the first discrete LED source.

5. The device of claim 4, wherein the virtual filament is one of a plurality of virtual filaments including first and second virtual filaments that are distinct from each other, and the first and second discrete LED sources are sufficiently separated from each other so that they produce respectively the first and second virtual filaments.

6. The device of claim 1, wherein the virtual filament is one of a plurality of virtual filaments that form a virtual filament pattern.

7. The device of claim 6, wherein at least some of the virtual filaments in the virtual filament pattern change shape as a function of azimuthal observation angle.

8. The device of claim 7, wherein at least one of the virtual filaments in the virtual filament pattern does not substantially change shape as a function of azimuthal observation angle.

9. The device of claim 1, wherein the one or more discrete LED sources include a first discrete LED source, and light from the first discrete LED produces the virtual filament.

10. The device of claim 1, wherein the inner structured surface comprises first elongated features and the outer structured surface comprises second elongated features, the first elongated features being oriented at a first angle relative to the longitudinal axis and the second elongated features being oriented at a second angle relative to the longitudinal axis.

11. The device of claim 10, wherein the first and second angles each have a magnitude within a range from 80 to 100 degrees.

12. The device of claim 10, wherein one or both of the first and second elongated features comprise lenticular features.

13. The device of claim 10, wherein the first elongated features comprise lenticular features, and the second elongated features comprise prismatic features.

14. The device of claim 10, wherein both the first and second elongated features comprise lenticular features.

15. The device of claim 10, wherein at least one of the elongated first features and the elongated second features comprise a shape characterized by a cubic Bezier function.

16. The device of claim 1, wherein the tube comprises distinct first and second structured films, and wherein the first structured film comprises the inner structured surface and the second structured film comprises the outer structured surface.

17. The device of claim 1, wherein the tube comprises a structured film with opposed first and second major surfaces, and wherein the first major surface comprises the inner structured surface and the second major surface comprises the outer structured surface.

18. The device of claim 1, wherein the light-transmissive tube is a first light-transmissive tube, the longitudinal axis is a first longitudinal axis, the inner structured surface is a first inner structured surface, the outer structured surface is a first outer structured surface, the cavity is a first cavity, the light source assembly is a first light source assembly, and the one or more discrete LED sources are one or more discrete first LED sources, the device further comprising:
a second light-transmissive tube defining a second cavity extending along a second longitudinal axis parallel to the first longitudinal axis, at least a portion of the second tube comprising a second inner structured surface facing the second cavity, and a second outer structured surface facing away from the second cavity; and a second light source assembly disposed to inject light into the second cavity, the second light source assembly including one or more discrete second LED sources;

wherein the second inner structured surface and the second outer structured surface are configured to direct a third portion of the injected light out of the second tube through the outer structured surface and to direct a fourth portion of the injected light back into the second cavity, such that a second virtual filament appears in the second tube.

19. A lighting device, comprising:

a light-transmissive tube defining a cavity extending along a longitudinal axis, at least a portion of the tube comprising an inner structured surface facing the cavity, and an outer structured surface facing away from the cavity;

a light source assembly disposed to inject light into the cavity, the light source assembly including one or more discrete LED sources;

wherein the inner and outer structured surfaces are configured to direct a first portion of the injected light out of the tube through the outer structured surface and to direct a second portion of the injected light back into the cavity, such that a virtual filament appears in the tube; and a first highly reflective optical film that partially surrounds the cavity to provide at least a first elongated aperture for the lighting device, the virtual filament being visible in the first elongated aperture.

20. The device of claim 19, wherein the inner and outer structured surfaces are included on a first strip of at least one structured film, and wherein the first highly reflective optical film comprises a second strip, and wherein the first and second strips partially overlap to define an overlap region and attach to each other along the overlap region.

21. The device of claim 20, further comprising a second highly reflective optical film that partially surrounds the cavity to provide at least a second elongated aperture for the lighting system different from the first elongated aperture, the virtual filament also being visible in the second elongated aperture.

22. The device of claim 1, wherein the virtual filament is a continuous curve or line.

23. The device of claim 1, wherein the virtual filament is discontinuous.

* * * * *